United States Patent [19]

Nakamatsu et al.

[11] Patent Number: 5,592,196

[45] Date of Patent: Jan. 7, 1997

[54] PICTURE DATA PROCESSING APPARATUS

[75] Inventors: Akira Nakamatsu; Tomio Suzuki, both of Kanagawa, Japan

[73] Assignee: Sony Corporation, Tokyo, Japan

[21] Appl. No.: 432,686

[22] Filed: May 2, 1995

Related U.S. Application Data

[63] Continuation of Ser. No. 9,317, Jan. 26, 1993, abandoned.

[30] Foreign Application Priority Data

Jan. 29, 1992 [JP] Japan ............................ 4-040156

[51] Int. Cl.[6] .................................................. G09G 5/02
[52] U.S. Cl. ........................... 345/150; 345/153; 345/199
[58] Field of Search .......................... 345/22, 150, 153, 345/154, 186–188, 199

[56] References Cited

U.S. PATENT DOCUMENTS

| | | | |
|---|---|---|---|
| 4,490,797 | 12/1984 | Staggs et al. | 345/199 |
| 4,500,875 | 2/1985 | Schmitz | 345/199 |
| 4,613,852 | 9/1986 | Maruko | 340/703 |
| 4,677,571 | 6/1987 | Riseman et al. | 345/203 |
| 4,682,297 | 7/1987 | Iwami | 345/199 |
| 4,712,099 | 12/1987 | Maeda | 345/153 |
| 4,749,990 | 6/1988 | Birkner | 345/113 |
| 4,777,481 | 10/1988 | Craver | 340/703 |
| 4,804,948 | 2/1989 | Nishi et al. | 340/703 |
| 4,855,831 | 8/1989 | Miyamoto et al. | 345/113 |
| 4,857,901 | 8/1989 | Lathrop | 345/150 |
| 5,195,180 | 3/1993 | Takakura et al. | 345/153 |
| 5,233,684 | 8/1993 | Ulichney | 345/154 |

FOREIGN PATENT DOCUMENTS 2-285417  11/1990  Japan.

*Primary Examiner*—Ulysses Weldon
*Assistant Examiner*—Amare Mengistu
*Attorney, Agent, or Firm*—Jay H. Maioli

[57] ABSTRACT

An image data processing apparatus such as an image synthesizing apparatus that synthesizes an image produced by a computer in accordance with tables stored in pages. A picture data conversion circuit converts picture data of red, blue and green color signals or picture data of luminance and color difference signals to predetermined converted picture data. A page change circuit switches the page of the picture data conversion circuit on the basis of alpha data representing transparency of the color picture data. An image data processing apparatus generates virtual addresses based on predetermined reference addresses in an address space larger than the frame memory addresses for accessing a plurality of frame memories at a low-order bit of the virtual address by selecting and outputting the image data outputted from the plurality of frame memories on the basis of a high-order bit of the virtual address. A processing form of color signal or luminance signal and color difference signals are recorded to a mode register when storing the picture data in the picture memory. Output data of the picture memories are directly outputted, or are converted into color signals, corresponding to the contents of the mode register.

5 Claims, 20 Drawing Sheets

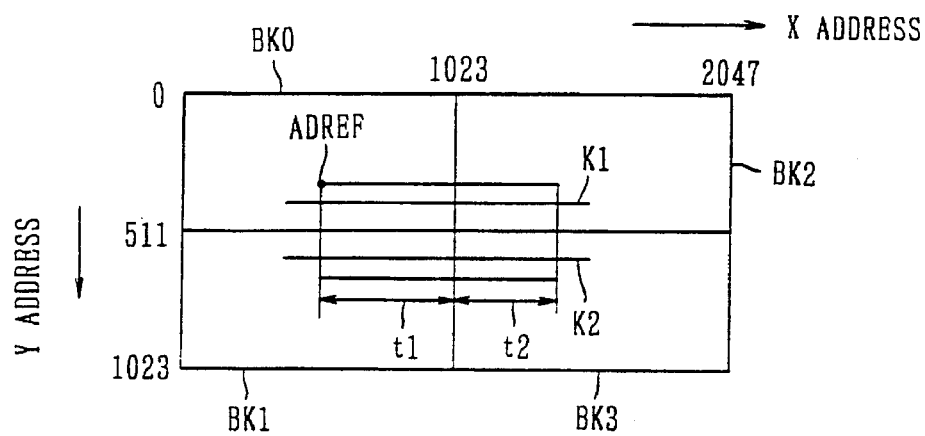
FIG. 14
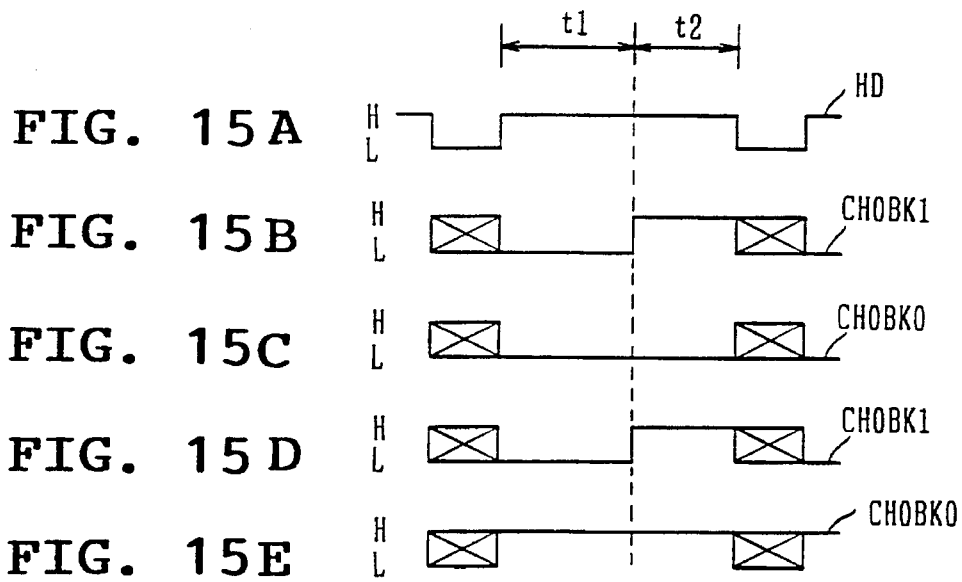

PICTURE DATA PROCESSING APPARATUS

This is a continuation of application Ser. No. 08/009,317, filed Jan. 26, 1993, now abandoned.

FIELD OF THE INVENTION

This invention relates to a picture data processing apparatus, and may be applied to an image synthesizing apparatus which synthesizes a picture produced by a computer, for example, with a desired picture.

BACKGROUND OF THE INVENTION

In the conventional picture synthesizing apparatus, a picture is produced by a computer or the like, and then the picture is synthesized with a desired picture. In this manner, the picture is used as a telopper, for example, and may be superimposed with a predetermined title or the like.

More specifically, in this kind of picture synthesizing apparatus picture data which has been outputted from a computer is temporarily stored in a picture memory, and then replaces picture data of the background picture, using a predetermined key signal as a reference. In such a manner, for example, a desired title may be superimposed, or characters of a man, animals, etc. may be fit in a natural picture.

In such a kind of picture synthesizing apparatus, it is considered that it is convenient if operability may be improved using a simple construction.

SUMMARY OF THE INVENTION

In view of the foregoing, an object of this invention is to provide a picture data processing apparatus which is capable of enhancing operability using a simple construction.

The foregoing objects and other objects of the invention have been achieved firstly by the provision of the picture data processing apparatus as first aspects of the present invention comprising: a frame memory 50 for outputting image data DG and alpha data Sα, representing transparency of the picture data DG, the picture data DG having red, blue and green color signals or containing luminance signals and color difference signals; picture data conversion means 61 for switching a page in response to a page selection signal SELP, and for converting the picture data DG to predetermined converted picture data DR, Dg and DB in accordance with a table stored in the page, the picture data being outputted from the frame memory 50, and including red, blue and green color signals or containing luminance signals and color difference signals; and page change means 100 for outputting the page selection signal SELP on the basis of the alpha data Sα.

In the first aspects of the present invention, in accordance with the tables stored in pages, picture data DG of red, blue and green color signals or picture data DG of luminance signals and color difference signals are converted to predetermined picture data DR, Dg and DB, which are outputted. This enables a fine color space such as a natural picture to be reproduced.

In this event, on the basis of the alpha data Sα a page selection signal SELP is outputted to thereby switch the page. This enables that the cursor is displayed with ease; a predetermined region may be painted up; and moreover palette animation is easily achieved. Therefore, the operability is enhanced with a simple construction.

According to the first aspects of the present invention, picture data of red, blue and green color signals or picture data of luminance signals and color difference signals is converted to corresponding independent converted picture data, which are outputted. Moreover, the conversion tables are switched on the basis of alpha data. Therefore, according to the present invention there is provided a picture data processing apparatus in which a fine color space such as a natural picture can be reproduced; the cursor can be displayed with ease; a predetermined region may be painted up; and the operability is therefore enhanced with a simple construction.

Secondarily, the picture data processing apparatus as second aspects of the present invention, comprises frame memories BK0 to BK3 which output the picture data DG, based on predetermined addresses X0 to X9 and Y0 to Y8; address generation circuits 88, 89, 90 and 91 generate virtual addresses X0 to X10 and Y0 to Y10 which are sequentially changeable values, in raster scanning sequence, and which refer to a predetermined reference address ADREF, in an address space larger than addresses X0 to X9 and Y0 to Y8; and picture data selection circuits 54, 56, 58, 60 and 95 which input to frame memories BK0 to BK3, virtual addresses X0 to X10 and Y0 to Y10 of low-order bit data X0 to X9 and Y0 to Y8 as address data, and select and output the picture data DG outputted from a frame memories BK0 to BK3, on the basis of high-order bit data X10, Y9 and Y10 of virtual addresses X0 to X10 and Y0 to Y10.

Further in the picture data processing apparatus, the picture data selection circuits 54, 56, 58, 60 and 95 have predetermined conversion tables 93 and 94, corresponding to selection modes of frame memories BK0 to BK3, and high-order bit data X10, Y9 and Y10 are converted to frame memory selection data CHOBK1 and CHOBK0 which select frame memories BK0 to BK3, on the basis of conversion tables 93 and 94, and then there select and output the picture data DG outputted from frame memories BK0 to BK3, on the basis of frame memory selection data CHOBK1 and CHOBK0.

Further the picture data processing apparatus comprises: frame memories BK0 to BK3 which output the picture data DG, based on predetermined addresses X0 to X9 and Y0 to Y8; first address generation circuit 85 for generating first virtual addresses X0 to X10 and Y0 to Y10, which are sequentially changeable values, in raster scanning sequence, and which are based on second reference address ADREF, in an address space larger than addresses X0 to X9 and Y0 to Y8; second address generation circuit 86 for generating second virtual addresses X0 to X9 and Y0 to Y10, which are sequentially changeable values, in raster scanning sequence, and which are based on second reference address ADREF, in an address space larger than addresses X0 to X9 and Y0 to Y8; the picture data selection circuits 54, 56, 58, 60 and 95 for selecting and outputting the picture data DG, corresponding to the first and second virtual addresses X0 to X10 and Y0 to Y10, wherein sequentially outputting to the frame memories BK0 to BK3, low-order bit data X0 to X9 and Y0 to Y8 of the first and second virtual addresses X0 to X10 and Y0 to Y10 as addresses, with selecting and inputting the picture data DG, outputted from frame memories BK0 to BK3, on the basis of high-order bit data X10, Y9 and Y10 of the first and second virtual addresses X0 to X10 and Y0 to Y10.

In the second aspects of the present invention, in an address space larger than addresses X0 to X9 and Y0 to Y8, there are generated virtual addresses X0 to X10 and Y0 to Y10, values of which are changeable sequentially on the basis of predetermined reference address ADREF, then output to frame memories BK0 to BK3 as address, low-order bit data of the virtual addresses X0 to X10 and Y0 to Y10, X0 to X9 and Y0 to Y8, with selecting and outputting the picture data DG, outputted from frame memories BK0 to BK3, on the basis of high-order bit data of virtual addresses X0 to X10 and Y0 to Y10, X10, Y9 and Y10. Thereby, as compared with outputting frame memories BK0 to BK3, based on predetermined addresses X0 to X9 and Y0 and Y8, it is capable of using frame memories BK0 to BK3, by rearranging the position, corresponding to the value of reference address ADREF. Therefore, it can perform the process using small picture memory the same as using mass image memory.

On the basis of the frame memory selection data CHOBK1 and CHOBK0, in selecting and outputting the picture data DG, outputted from frame memories BK0 to BK3, after converting into frame memory selection data CHOBK1 and CHOBK0, at conversion tables 93 and 94, thereby, it is capable of using frame memories BK0 to BK3, by switching the combination. Therefore, the operability is enhanced with a simple construction.

On the basis of the first reference address ADREF and second reference address ADREF, the address generates first virtual addresses X0 to X10 and Y0 to Y10 and second virtual addresses X0 to X10 and Y0 to Y10, then outputting to frame memories BK0 to BK3 as address, low-order bit data of said first and second virtual addresses X0 to X10 and Y0 to Y10, X0 to X9 and Y0 to Y8, by selecting and inputting the picture data DG, outputted from frame memories BK0 to BK3, on the basis of high-order bit data of first and second virtual addresses X0 to X10 and Y0 to Y10, then selecting and outputting the picture data DG, corresponding to first and second virtual addresses X0 to X10 and Y0 to Y10. Thereby, the picture data DG obtained from the two systems is capable of use, by rearranging the positions of frame memories BK0 to BK3.

According to the second aspects of the present invention, the virtual address is generated on the basis of the reference address, in the large address space, as compared with frame memories which output an picture data, on the basis of predetermined address data, and access frame memories at the low-order bit, with selecting and outputting the picture data of frame memories, on the basis of the high-order bit of the virtual address. Therefore, the process can be performed the same as using mass picture memory, by use of small picture memory.

Further, then the picture data of frame memory is to be selected and outputted, on the basis of the frame memory selection data, after converting into frame memory selection data, said high-order bit, by use of a conversion table; thereby, it can be used to switch combinations of frame memories, only renewing the content the conversion table, and the operability is therefore enhanced with a simple construction.

Furthermore, having two types of virtual address generation means, so as to output two types of picture data, thereby uses the combination of positions of said frame memories.

Thereby, the picture data can be processed with simple construction, with using small frame memory, and the picture data processing apparatus can be obtained wherein the operability is therefore enhanced with a simple construction.

Thirdly, in the present invention, the picture data processing apparatus selects processing form of red, blue and green color signals SR, SB and SG, or processing form of luminance signal Y and color difference signals R-Y and B-Y. The picture data processing apparatus 1, which processes the picture data DG, by selected processing form, comprises: a mode register 110 for registering a processing form mode; a picture memory 50, for storing the picture data DG of red, blue and green color signals SR, SB and SG, or picture data DG of luminance signal Y and color difference signal R-Y and B-Y, corresponding to the selected processing form; and a picture data conversion circuit 75 wherein, when the picture data DG outputted from the picture memory 50, corresponding to the content of the mode register 110, is red, blue and green color signals SR, SB and SG, said color signals SR, SB and SG of picture data DG, and when the picture data DG outputted from the picture memory 50, corresponding to the content of the mode register 110, is luminance signal Y and color difference signals R-Y and B-Y, the picture data DG is output after converting into red, blue and green color signals SR, SB and SG.

In the third aspects of the present invention, in accordance with the content of the mode register 110, when the picture data DG outputted from the picture memory 50, are picture data DG of red, blue and green color signals SR, SB and SG, it directly outputs the color signals SR, SB and SG of picture data DG. When the picture data DG outputted from the picture memory 50, are picture data DG of luminance signal Y and color difference signals R-Y and B-Y, it outputs, with conversion into red, blue and green color signals SR, SB and SG, said picture data DG, thereby, it can always output color signals SR, SB and SG, in spite of switching process form. Thus, it can be switched freely as to process form, by omitting a connection switching operation etc. Therefore, the operability is enhanced.

According to the third aspects of the present invention, when the picture data is to be outputted in the form of color signal, in accordance with the content of mode register, and also when the color signal is to be directly outputted, and said picture data is to be outputted in the form of luminance signal and color difference signal, color signal can be outputted, in the case of which the processing form of the picture data is luminance signal or color difference signal, by outputting and converting the color signal. Therefore, the processing form can be switched freely, without a connection switching operation of the display system etc., and the operability is therefore enhanced.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 14 is a schematic view showing a case where a picture for synthesizing bridges four banks;

FIGS. 15A to 15E are signal waveform diagrams showing the relationship between the change of banks and switch signals;

DETAILED DESCRIPTION OF THE INVENTION

Preferred embodiments of this invention will be described with reference to the accompanying drawings:

(1) General configuration

Figure 1:
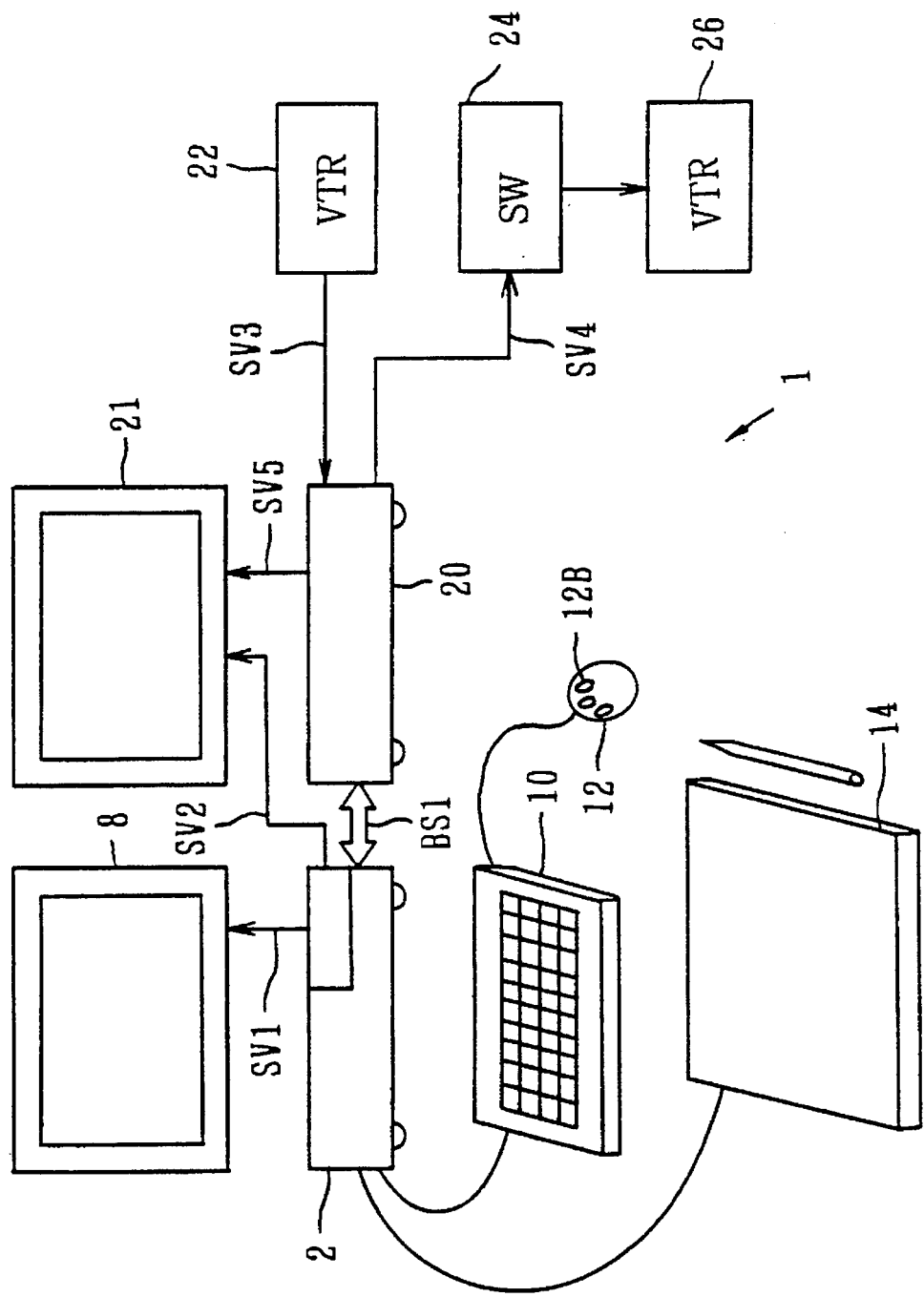
FIG. 1 is a block diagram showing a video graphic system according to one embodiment of the present invention.

In FIG. 1, 1 generally designates a video graphic system, which produces a picture to be synthesized (hereinafter referred to as "picture for synthesizing") by a computer 2 which is a workstation.

Figure 2:
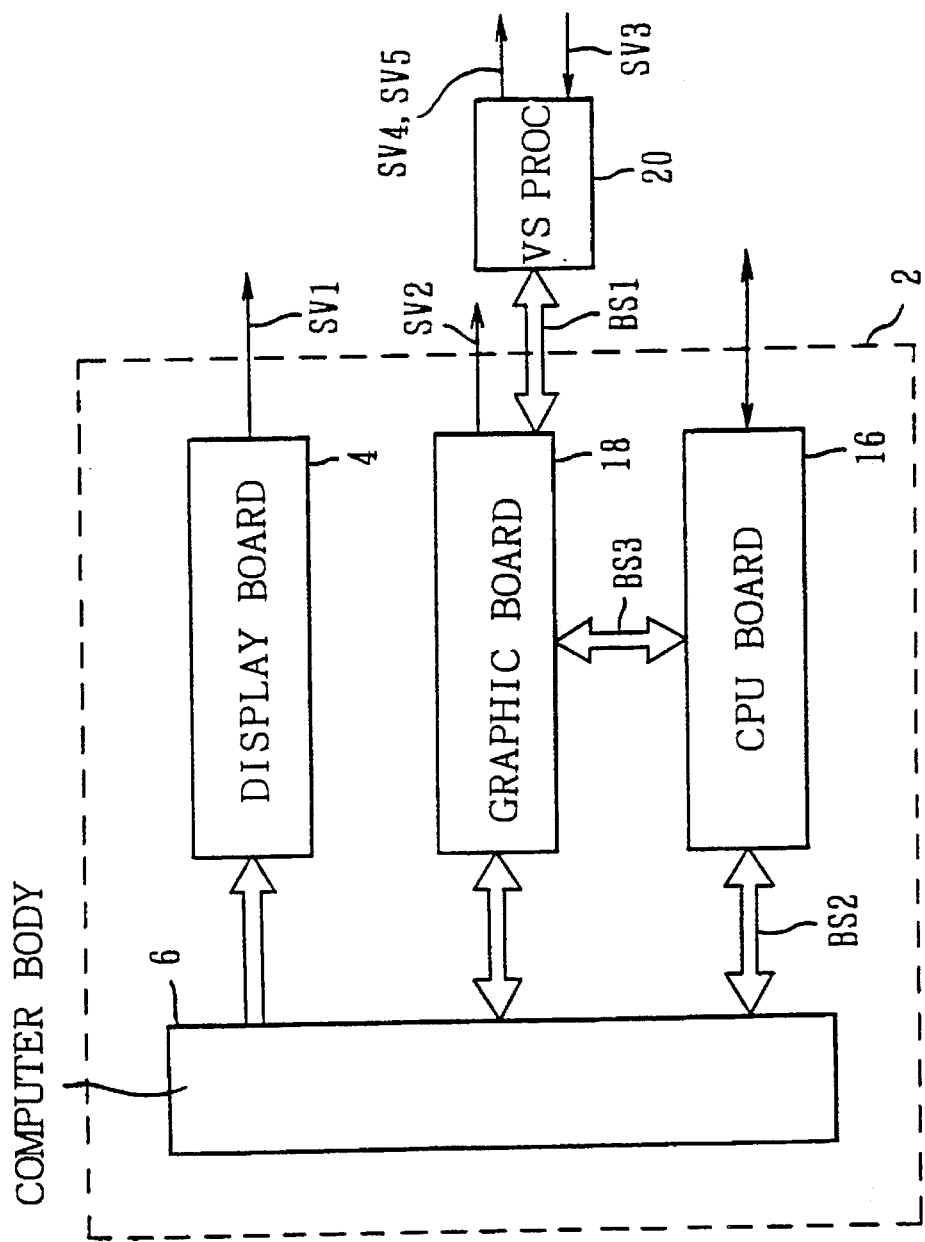
FIG. 2 is a block diagram showing the overall configuration thereof.

More specifically, as shown in FIG. 2, the computer 2 outputs a video signal SV1 from a computer body 6 to a display 8 through a display board 4, and this enables the user to operate the video graphic system 1 by manipulating a keyboard 10, a mouse 12, and a tablet 14, to monitor the screen of the display 8.

In this event, the computer 2 stores picture data of the picture for synthesizing in a graphic board 18 through a CPU (central processing unit) board 16.

Furthermore, in the computer 2 commands are sent out to the CPU board 16 in response to the keyboard 10, etc., and thereby the image data stored in the graphic board 18 may be sent to a video signal processing unit 20 through a bus BS1. Moreover, the picture data sent out from the video signal processing unit 20 may be stored in the graphic board 18 if necessary.

Therefore, in the computer 2, picture data to be synthesized, picture data for producing a picture for synthesizing, and the like may be inputted from and outputted to the video signal processing unit 20.

Furthermore, in the computer 2, a video signal SV2 may be sent out to a display 21, and this enables a picture for synthesizing to be formed, by monitoring the screen of the display 21.

The computer 2 has three slots at the rear face, by which the display board 4, the CPU board 16 and the graphic board 18 are held within the computer 2.

The video signal processing unit 20 may receive a background picture or the like for picture synthesizing by entering video signals SV3 of a video tape recorder (VTR) 22, and synthesize the background picture and the picture for synthesizing to produce a synthesized video signal in response to a command inputted through the bus BS1.

Furthermore, the video signal processing unit 20 outputs a synthesized video signal SV4 to a video tape recorder 26 through a switcher 24, and if necessary, outputs a synthesized video signal SV5 to the display 21, so that the synthesized picture may be recorded and monitored.

The video signal processing unit 20 may further output a video signal SV3 of the video tape recorder 22 to the computer 2, and in the computer 2 this enables a picture for synthesizing to be produced using the video signals SV3.

(1-1) CPU board

Figure 3:
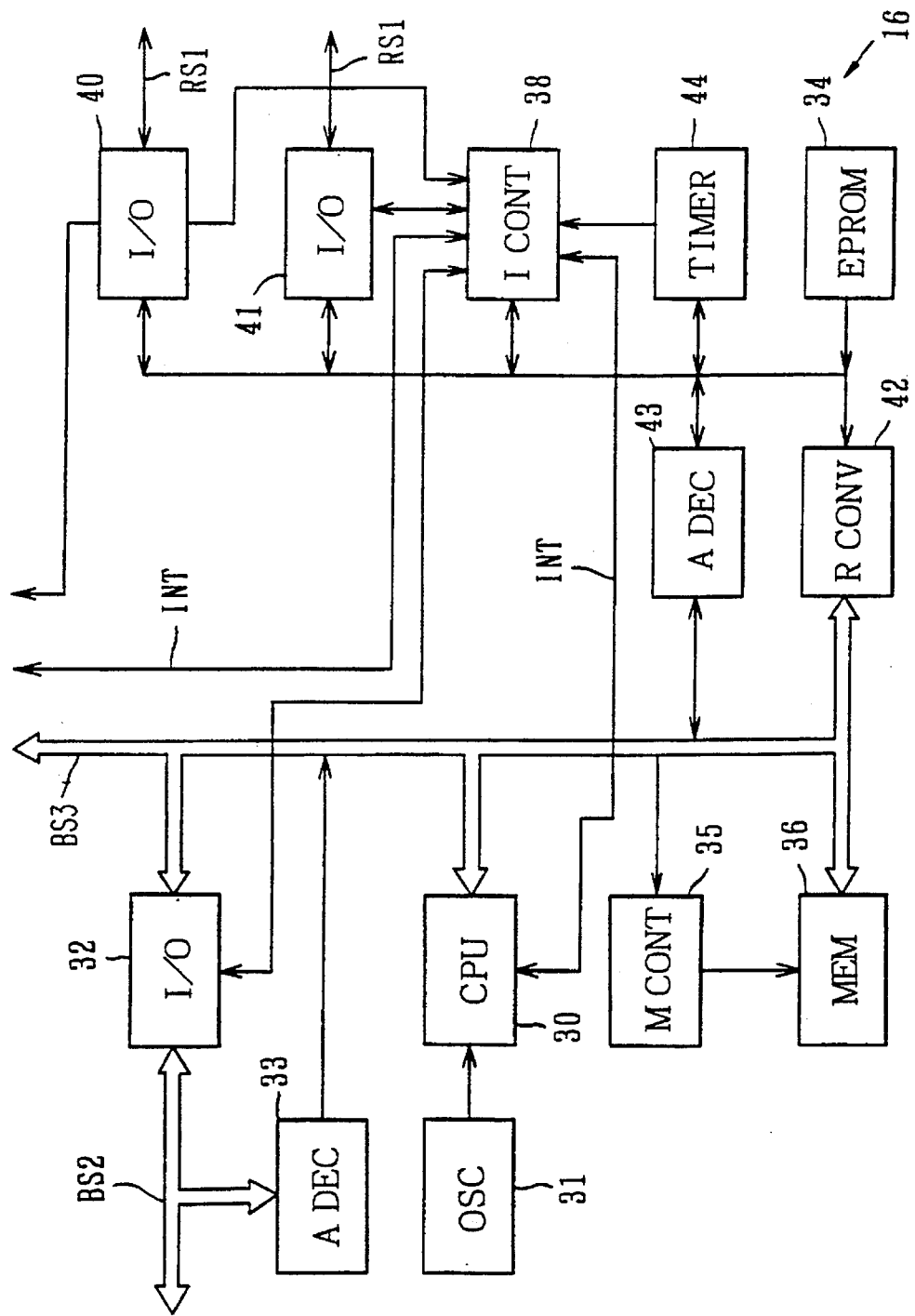
FIG. 3 is a block diagram showing the CPU board.

As shown in FIG. 3, the CPU board 16 has a CPU 30 dedicated to picture processing, which is connected to the computer body 6 through an input/output unit 32, including a buffer memory, via a 64 bit bus BS2.

More specifically, the CPU 30 is operated by clock signals outputted from an oscillating circuit 31, and executes a processing program stored in an EPROM 34 when the video graphic system 1 is turned on.

When the power is turned on, the CPU 30 downloads the processing program, outputted from the computer body 6, to a memory circuit 36 in accordance with the processing program.

In this event in the CPU board 16, the memory circuit 36 is controlled by a memory controller 35 on the basis of the results of the decoding of an address decoder, and thereby data sequentially inputted is stored in predetermined areas in the memory circuit 36.

When a command is inputted from the computer body 6 to the input/output unit 32 in response to the operation of the keyboard 10 or the like, the CPU 30 furthermore inputs an interrupt signal through an interrupt control circuit 38, the interrupt signal being outputted from the input/output unit 32.

This enables the CPU 30 to interrupt execution of the processing program on the basis of the interrupt signal, and then access the memory circuit 36, so that a predetermined procedure is executed in accordance with the command.

The CPU 30 thus outputs picture data subsequently inputted to the graphic board 18 through a bus BS3, and outputs a control signal to the graphic board 18 if necessary. Moreover, the CPU 30 reads out picture data from the graphic board 18, and performs an operation on and outputs the picture data. This enables the CPU to carry out air brushing, masking, picture deformation, etc.

In this event, the operation of the CPU 30 may be switched on the basis of control signals inputted through input/output circuits 40 and 41 (which are RS-232C interfaces, the standards of Electric Industries Association of U.S.), and this enables the whole operation of the video graphic system 1 to be controlled by a separate external unit.

In the CPU board 16, the 64 bit bus BS3 is connected to input/output circuits 40 and 41 or the like which are 8 bit devices through a rate conversion circuit 42 and an address decoder 43, and the whole device is refreshed at a predetermined timing using a timer 44.

(1-2) Graphic board

Figure 4:
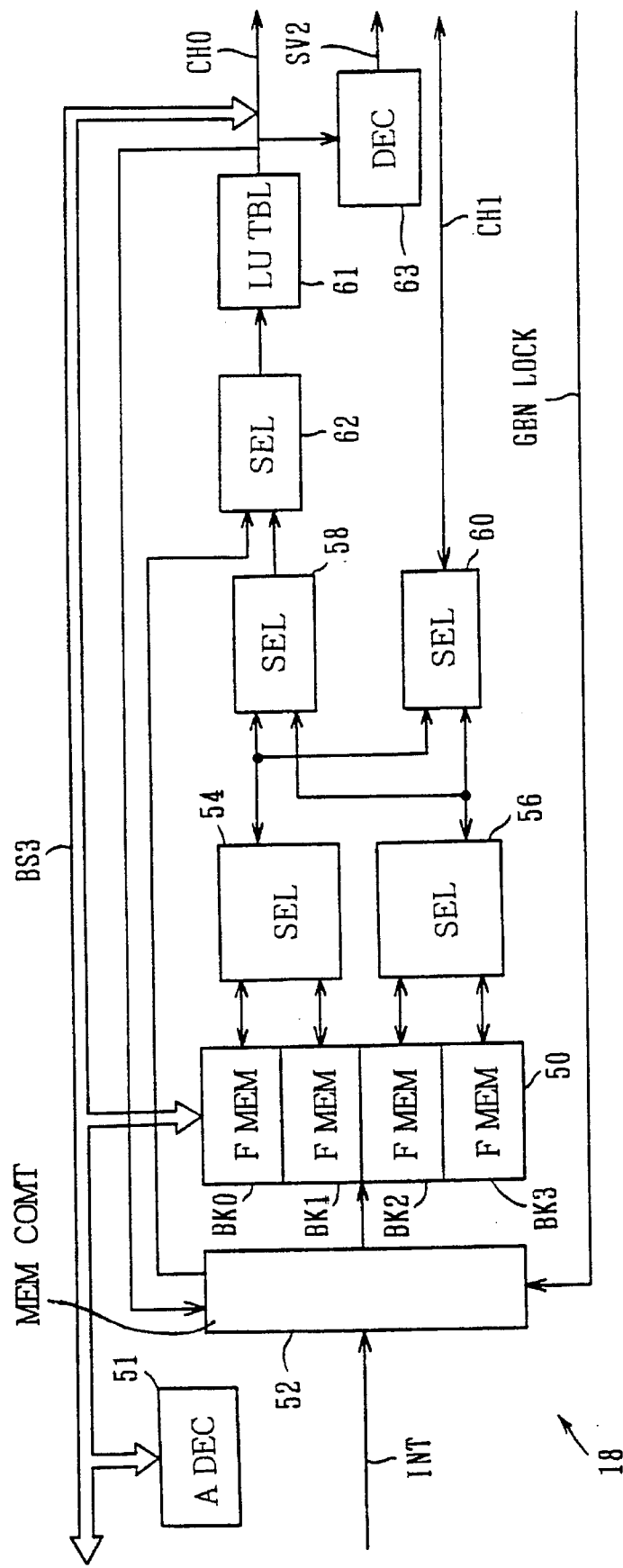
FIG. 4 is a block diagram showing the graphic board.

As shown in FIG. 4, the graphic board 18 stores 32 bit picture data, inputted through the bus BS3, in a picture memory 50, and sequentially outputs the picture data at predetermined timing. In this manner, picture data of a picture for synthesizing is outputted to the video signal processing unit 20.

Furthermore, the graphic board 18 stores picture data, inputted from the video signal processing unit 20, to the picture memory 50, and sends it out to the CPU board 16 if necessary.

The picture memory 50 consists of four frame memories each having a capacity of 2 MB (hereinafter referred to as banks, and indicated by reference characters BK0 to BK3, respectively). Two channel banks BK0 and BK1, and BK2 and BK3 are usually connected to two input and output channels, respectively.

The picture memory 50 is to be written in and read out by a memory controller 52 on the basis of the results of decoding of the address decoder 51. In this event, two channel banks BK0 and BK1, and BK2 and BK3 are used in combination to be able to execute various operations using a small memory capacity.

The picture memory 50 may furthermore input and output picture data in banks BK0 and BK1, and BK2 and BK3 through selectors 54 and 56, respectively.

A selector 58 selectively-accepts and outputs image data, outputted from the selectors 54 and 56, and in this embodiment the output channel of the selector 58 is used as the main channel CH0.

On the other hand, the selector 60 selectively can input picture data from and output it to selectors 54 and 56, and in this embodiment the channel of selector 60 is used as the subchannel CH1 for inputting picture data from and outputting it to the video signal processing unit 20.

A look up table 61 which has a memory circuit configuration receives picture data, outputted from the selector 58, as address data, and sends out data as picture data which is accessed in accordance with the address data.

This enables the look up table 61 to convert output data of the selector 62 to picture data in accordance with a predetermined rule and then to output the picture data. In this event the CPU board 16 updates the contents of the table, and thereby the picture data conversion rule is set to a predetermined relationship so that the address data and the output data may correspond at a ratio 1:1.

A selector 62 is inserted between the look up table 61 and the selector 58 to directly output predetermined picture data from the graphic board 18 on the basis of the address data produced in the main controller.

On the contrary, in the graphic board 18 the output data of the look up table 61 is fed back to the memory controller 52 to produce any address referring to the output data of the look up table 61 when needed.

Therefore in the graphic board 18, the main channel CH0 is assigned only to output of picture data, and the subchannel CH1 to input and output of picture data.

The graphic board 18 operates on the basis of an external synchronizing signal GENLOCK inputted from the video signal processing unit 20, and thereby picture data of a predetermined format (that is, format prescribed in CCIR-601, standards of International Radio Consultative Committee) may be transferred between the graphic board 18 and the video signal processing unit 20.

To correspond to this, each of the banks BK0–BK3 of the picture memory 50 may store 1024×512 pixels of picture data in x and y directions, the picture data being constructed of 8 bit color signals and alpha signals and being thus 32 bit data. Therefore, NTSC (standards of National Television System Committee) digital video signals prescribed in CCIR-601 (that is, 720×485 pixel signals) may be processed.

A decoder 63 decodes digital video signals of the main channel CH0, outputted with the format, and thereby converts picture data of the main channel CH0 into the video signal SV2, which are color signals, and outputs it.

(1-3) Video signal processing unit

Figure 5:
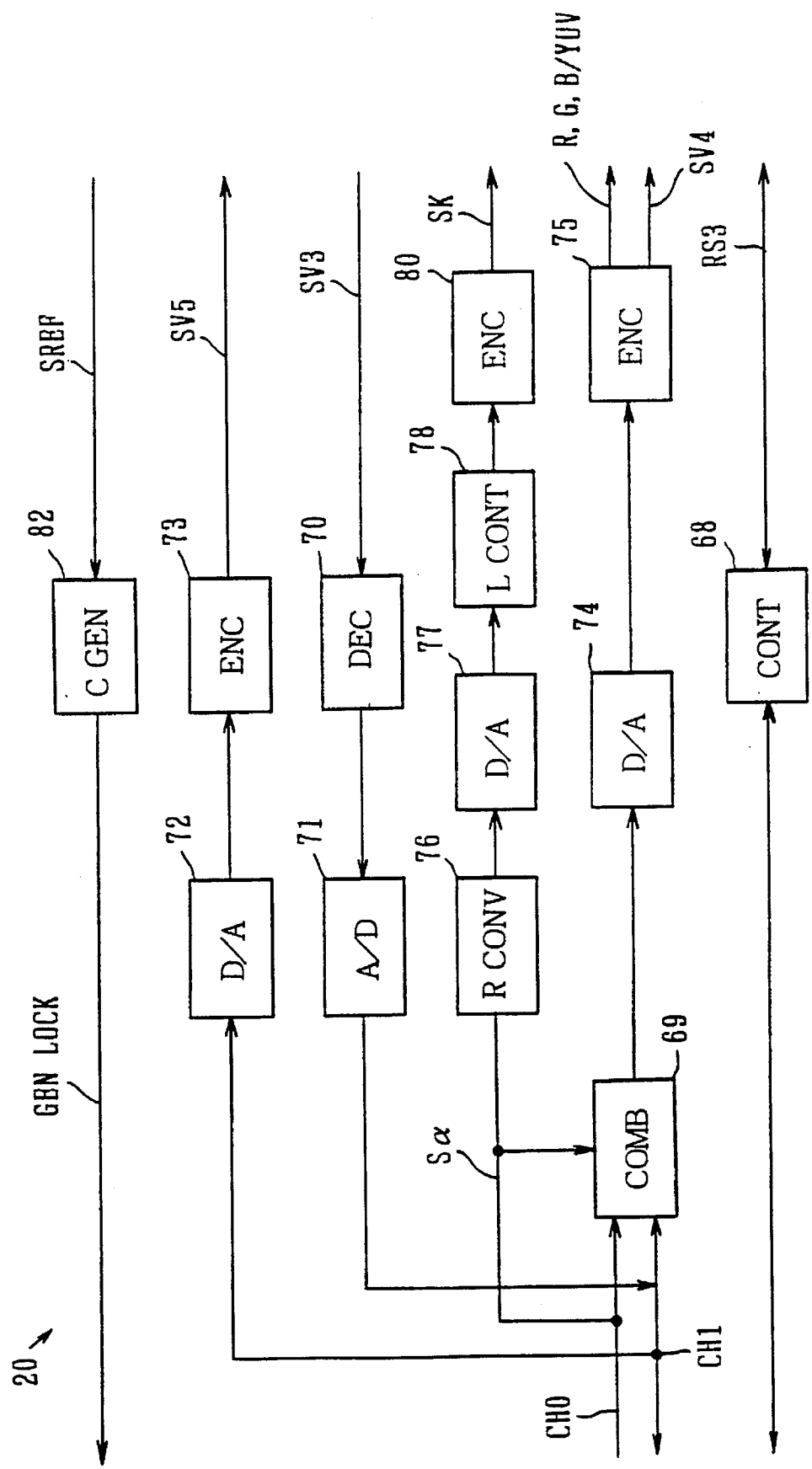
FIG. 5 is a block diagram showing the video signal processing unit.

In the video signal processing unit 20 as shown in FIG. 5, a combiner 69 combines and then outputs picture data of the main channel CH0 and the subchannel CH1.

In this event, in the video signal processing unit 20 the whole operation is controlled by the controller 68. Furthermore, the controller 68 may be controlled by control signals RS3 (in RS-232C and RS-422 formats) of the computer 2 and external devices in accordance with needs.

In the video signal processing unit 20, the video signal SV3 of the video tape recorder 22 are converted by a decoder 70 into a color signal, which is then outputted to the combiner 69 through an analog to digital conversion circuit 71. This enables pictures to be synthesized using picture data of the video signal SV3 instead of picture data of the subchannel CH1. When needed, picture data outputted from the analog to digital conversion circuit 71 may be outputted to the graphic board 18.

On the contrary to this, in the video signal processing unit 20, the picture data of the subchannel CH1 is converted by a digital to analog conversion circuit (D/A) 72 into analog signals, which are then converted by an encoder 73 into a video signal SV5 for outputting to be able to monitor a preview picture.

The combiner 69 performs addition by multiplying picture data of the main channel CH0 with picture data of the subchannel CH1 or with picture data, outputted from the analog to digital conversion circuit 71, on the basis of alpha data S$\alpha$ contained in the picture data of the main channel CH0 <the alpha data S$\alpha$ representing a transparency of the picture data of the main channel CH0). In this manner, the whole picture data is synthesized to form a predetermined picture.

More specifically, the multiplier is complimentarily switched between values 0 and 1. The addition processing is carried out by multiplying picture data of the main channel CH0 and the subchannel CH1 in the multiplier, and thereby the picture of the main channel CH0 can be superimposed on the picture of the subchannel.

If the picture of the main channel CH0, for example, is scrolled in this event, a title superimposed may be scrolled in the picture synthesized.

If the multiplier is sequentially complimentarily changed, pictures are synthesized so that the picture of the main channel is dimly shifted to the picture of the subchannel.

A digital to analog conversion circuit (D/A) 74 converts picture data, outputted from the combiner 69, into an analog signal, which is outputted. An encoder 75 converts the output signal of the digital to analog conversion circuit 74 into a synthesized video signal SV4, which is outputted.

This enables the video signal processing unit 20 to output the synthesized video signal SV4 of synthesized pictures through the encoder 75.

In this event, the encoder 75 outputs a synthesized video signal SV4 in a video signal format, and also it is possible to output the video signals in the format including color signals R, G and B, or luminance signal Y and color difference signals U and V. This enables the video signal processing unit 20 to switch the connection to external devices in accordance with the kind of the latter, and thereby the video graphic system 1 is enhanced in operability.

A rate conversion circuit 76 converts 8 bit alpha signals Sα into α signal, the alpha signal Sα varying in a range from 0 to 255 gradation while the α signal varies in a range from 16 to 235 gradation. Therefore, the gradation of the alpha signal Sα is converted into the gradation of luminance signal, which is outputted.

A digital to analog conversion circuit 77 converts the α signal into an analog signal, which is outputted.

The operation of a level controller 78 is switched on the basis of a control signal outputted from the computer 2, and thereby the level controller 78 directly outputs the α signal through an encoder 80 and, in accordance with the kind of the external device, converts the signals into a key signal SK, which is outputted.

This enables the video signal processing unit 20 to selectively output the key signal SK or the 8 bit signal in accordance with the external device, and thereby the whole system is enhanced in operability.

In the video signal processing unit 20, a burst signal SREF is supplied to a clock generating circuit 82, where various reference signals, such as external synchronizing signal GENLOCK, are generated using the burst signal SREF as a reference, and thereby the whole system is operated in synchronism with the video tape recorder 22.

(2) Control of the image memory

Figure 6:
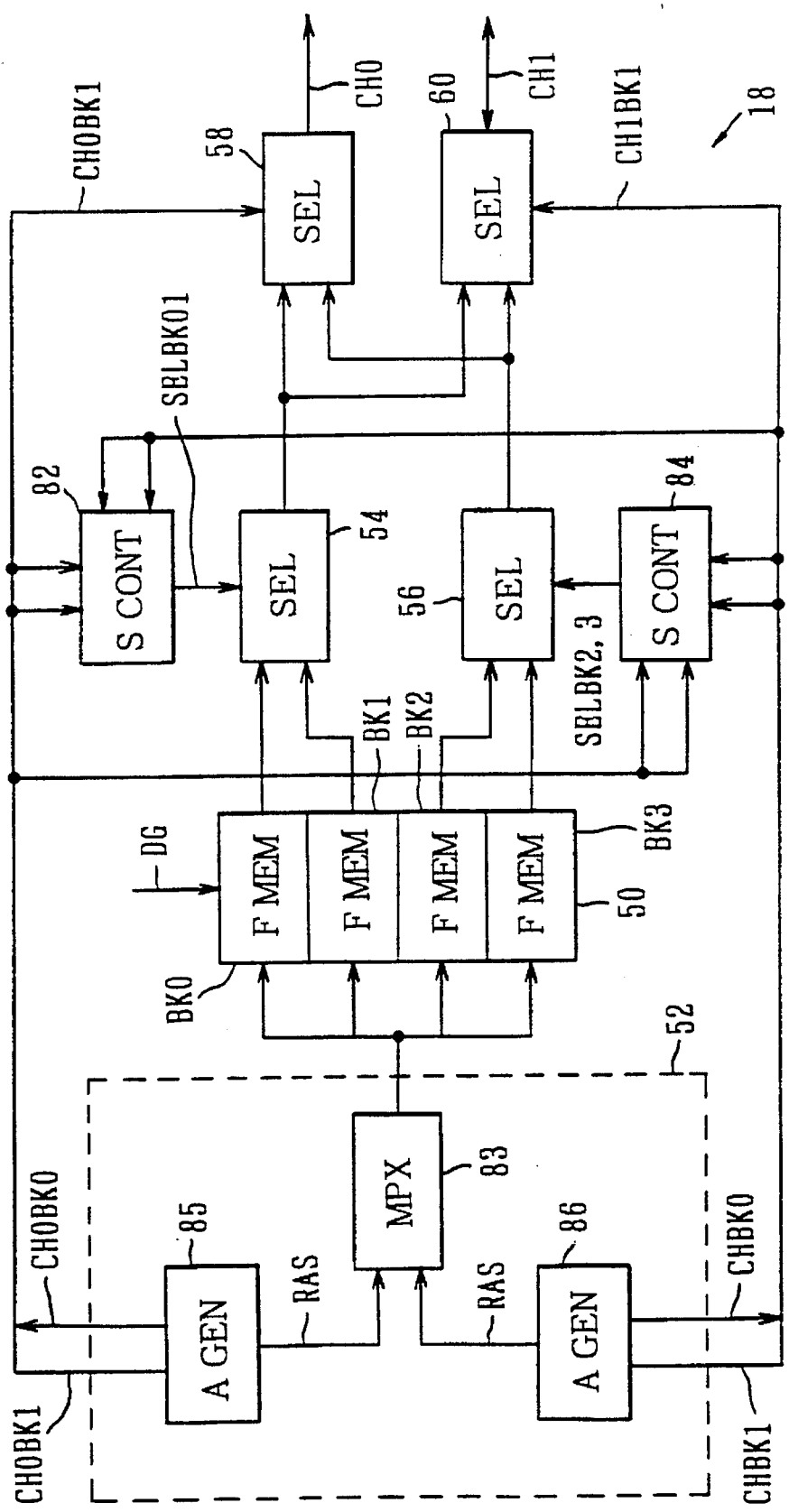
FIG. 6 is a block diagram for illustrating control of the picture memory.

In the graphic board 18 as shown in FIG. 6, address data produced in a memory controller 52 are outputted to selector controllers 82 and 84, which thereby control selectors 54 and 56 as well as selectors 58 and 60 using the address data as a reference.

In the memory controller 52, address data is sequentially produced in accordance with address data outputted from the CPU board 16 during storing of picture data, and thereby picture data DG is sequentially stored in predetermined regions of banks BK0–BK3 of the picture memory 50.

On the other hand, in the memory controller 52 address generating circuits 85 and 86 respectively produce address data of the main channel CH0 and the subchannel CH1 during reading out of picture data, and output data of the least significant bits of the address data to the picture memory 50 through a multiplexer (MPX) 83.

Figure 7:
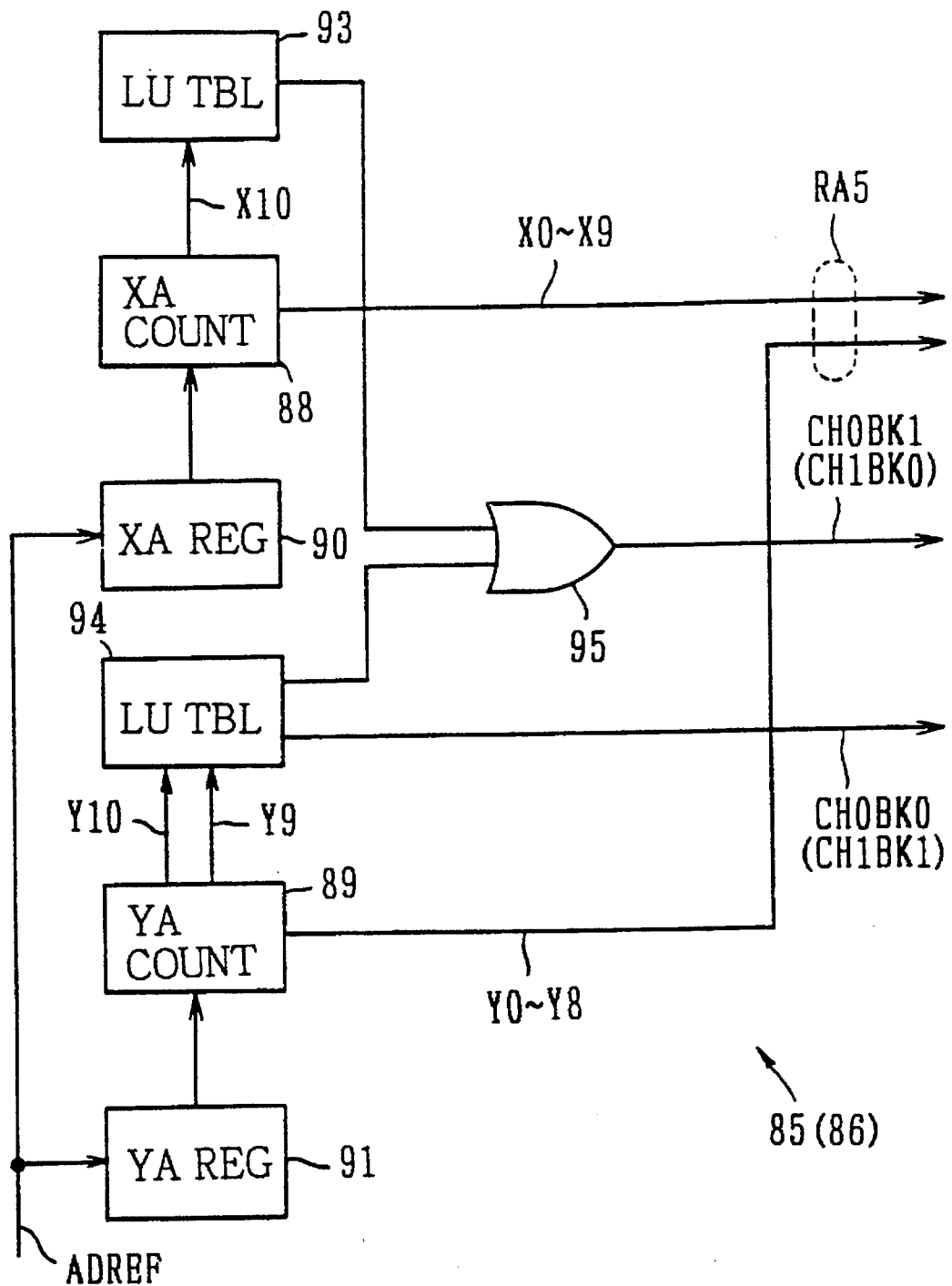
FIG. 7 is a block diagram showing the address generation circuit.

More specifically, as shown in FIG. 7 the address generating circuits 85 and 86 have the same configuration, and generate x and y direction address data in a X address counter 88 and a Y address counter 89, respectively.

In this event a X address register 90 and a Y address register 91 store reference address data ADREF outputted from the CPU board 16 for outputting to the X address counter 88 and the Y address counter 89, and in the X address counter 88 and the Y address counter 89 address data is sequentially generated in the order of the raster scanning of the picture data, determined by the reference address data ADREF, being used as a starting point.

In the video graphic system 1, by indicating the position of the starting point with the mouse 12 a picture may be processed by cutting it out from the picture memory 50 using the starting point as a reference.

Therefore, in the video graphic system 1 a picture to be cut out may be indicated with ease, and the operability is improved.

Moreover in the CPU board 16 the position of the starting point given by the reference address data ADREF is sequentially updated in accordance with the setting of the user, and thereby a picture for synthesizing may be scrolled by sequentially moving the position of the picture to be cut out.

In the video graphic system 1 a picture for synthesizing may be scrolled with such a simple construction as to produce address data from the position of a starting position given by the reference address data ADREF, and thereby peripheral circuits of the picture memory 50 are simplified with the result that the overall construction is simplified.

Figure 8:
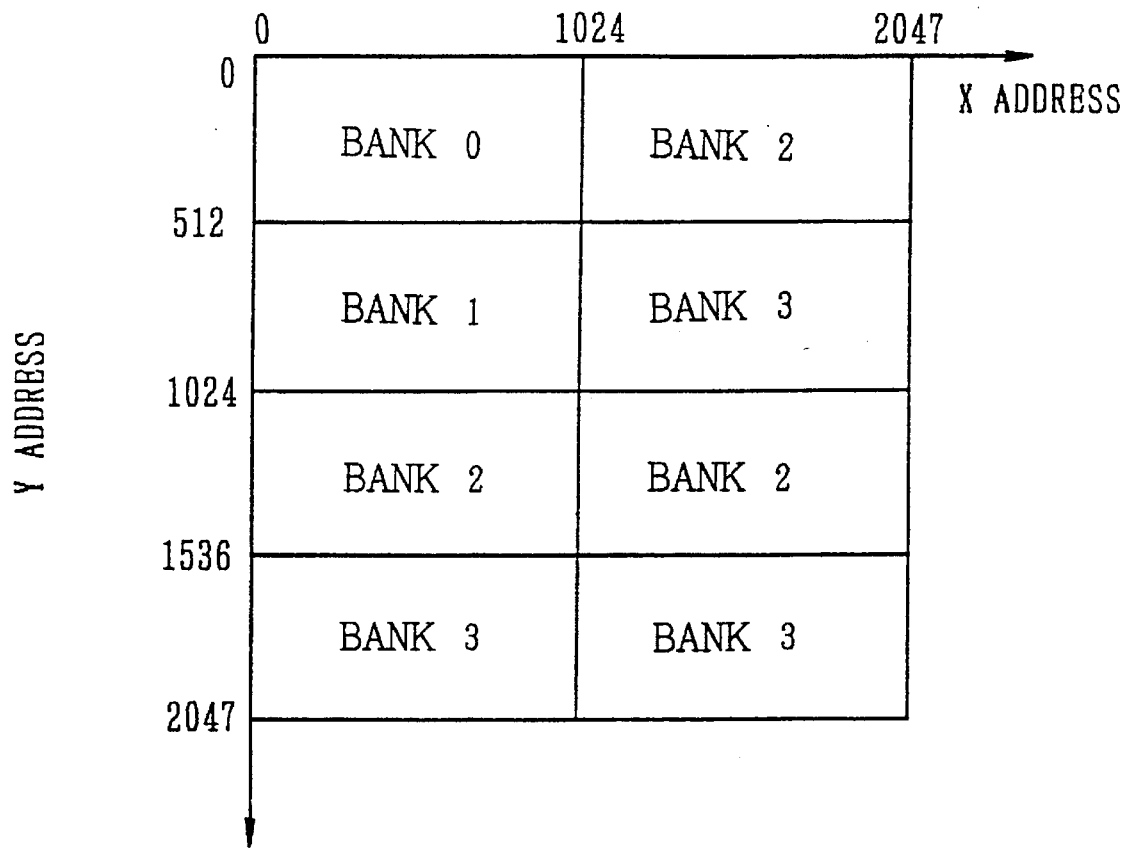
FIG. 8 is a schematic view for illustrating banks.

In this embodiment the X address counter 88 and the Y address counter 89 generate address data in such an address space as shown in FIG. 8.

More specifically, the X address counter 88 produces X direction address data in an area from location 0 to 2047 which are within an address space of two banks in the X direction. On the other hand, the Y address counter 89 generates Y direction address data in an area from location 0 to 2047 which are within an address space of four banks in the Y direction.

Moreover, in the X address counter 88 the generated address data X0 to X9 of least significant 10 bits is outputted to each of the banks BK0 to BK3 whereas the Y address counter 89 outputs the generated least significant 9 bit address data Y0 to Y8 to each bank BK0 to BK3.

In each of the banks BK0 to BK3, picture data is outputted in a simultaneous, parallel manner on the basis of the address data X0 to X9 and Y0 to Y8.

The X address counter 88 outputs the address data X10 of the most significant bit to a look up table 93 whereas the Y address counter 89 outputs the address data Y9 and Y10 of the most significant 2 bits to a look up table 94.

In the look up tables 93 and 94, the contents thereof are updated in the CPU board 16, and thereby address data which is held at a ratio of 1:1 over the address data X10 and the address data Y9, Y10, for example, is outputted.

In this event the memory controller 52 outputs a bank switch signal through the look up table 93 so as to raise the logical value when the X direction address data goes beyond location 1024 while the memory controller 52 outputs a 2 bit bank switch signal through the look up table 94 so as to switch the logical value when the Y direction address data goes beyond locations 512, 1024 and 1536.

The memory controller 52 controls the selectors 54, 56, 58 and 60 using the bank change signal as a reference, and thereby selectively outputs picture data which is outputted from each of the banks BK0 to BK3 in a simultaneous, parallel manner. This makes it possible to control the picture memory 50 in a virtual address space as if 8 frame memory circuits are used.

In such a manner, the memory controller 52 switches the arrangement of the banks BK0 to BK3 in accordance with address data, and thereby four frame memories may be used as if 8 frame memories exist. The video graphic system 1 may be enhanced in operability in a small memory space.

More specifically, an OR circuit 95 receives most significant bits of X and Y direction address data through look up tables 93 and 94, and outputs the resulting output signal CH0BK1 (CH1BK1) to the selector 58 (60).

The OR circuit 95 therefore selectively outputs picture data, outputted from the selector 56, instead of picture data outputted from the selector 54, to each of the main channel CH0 and subchannel CH1 in the case where address data of X or Y direction exceeds location 1024.

On the other hand, selector controllers 82 and 84 control selectors 54 and 56 on the basis of the output signal CH0BK1 (CH1BK1) of the OR circuit 95 and the second most significant bit data CH0BK0 (CH1BK0).

More specifically in the selector 54 picture data of the bank BK1 is selected in place of the bank BK0 when the Y direction address data goes beyond location 512 in a range not beyond location 1024.

On the other hand in the selector 56, picture data of the bank BK3 is selected in place of the bank BK2 when the Y direction address data goes beyond location 1536 while the X address data is in a range not beyond location 1024. When the X direction address goes beyond location 1024, picture data of the bank BK3 is selected in place of the bank BK2, the Y direction address data being within ranges from location 512 to 1023 and from location 1536 to 2047.

This enables that in the graphic board 18 the banks BK0 to BK3 may be used so that the picture memory is, as shown in FIG. 8, divided in the virtual address space, and therefore the video graphic system 1 can be improved in operability using a small memory capacity.

Moreover in the graphic board 18, by merely generating address data within a range of the virtual address space using the reference address data ADREF as a reference the banks BK0 to BK3 may be used while the arrangement thereof is switched. The peripheral circuits of the picture memory 50 may be therefore simplified in construction.

Figure 9:
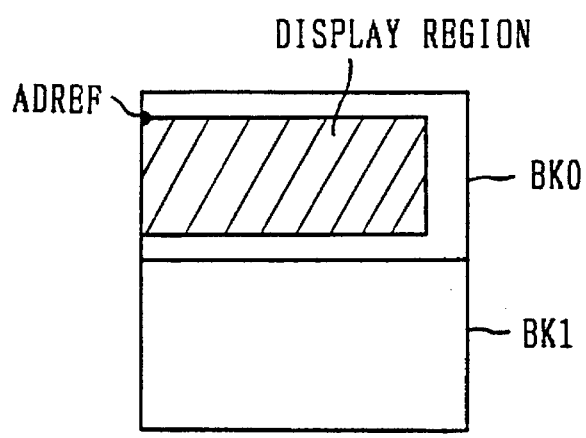
FIG. 9 is a schematic view for illustrating the change of the channel.
Figure 10:
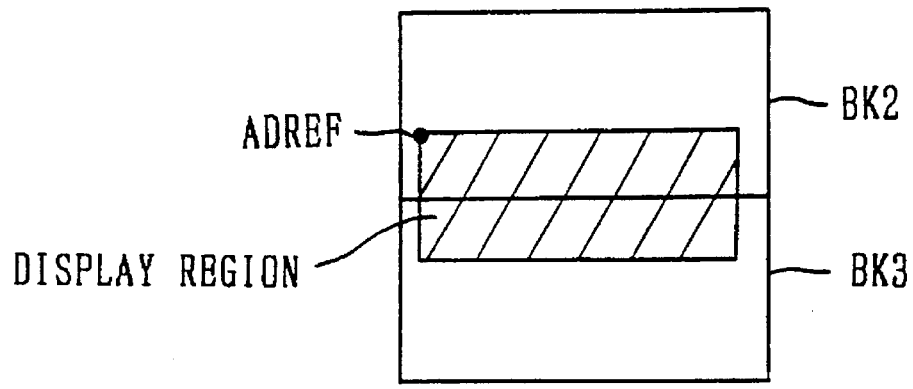
FIG. 10 is a schematic view showing a case where a display region bridges two banks.

More specifically, when the Y direction address data, generated in each of the address generating circuits 85 and 86 as shown in FIGS. 9 and 10, is located in a range of location 0 to 1023 or location 1024 to 2048, the banks BK0, BK1 and BK2, BK3 are assigned to the main channel and subchannel CH0 and CH1, respectively. For example, a picture for synthesizing may be formed of picture data of the area hatched.

Figure 11:
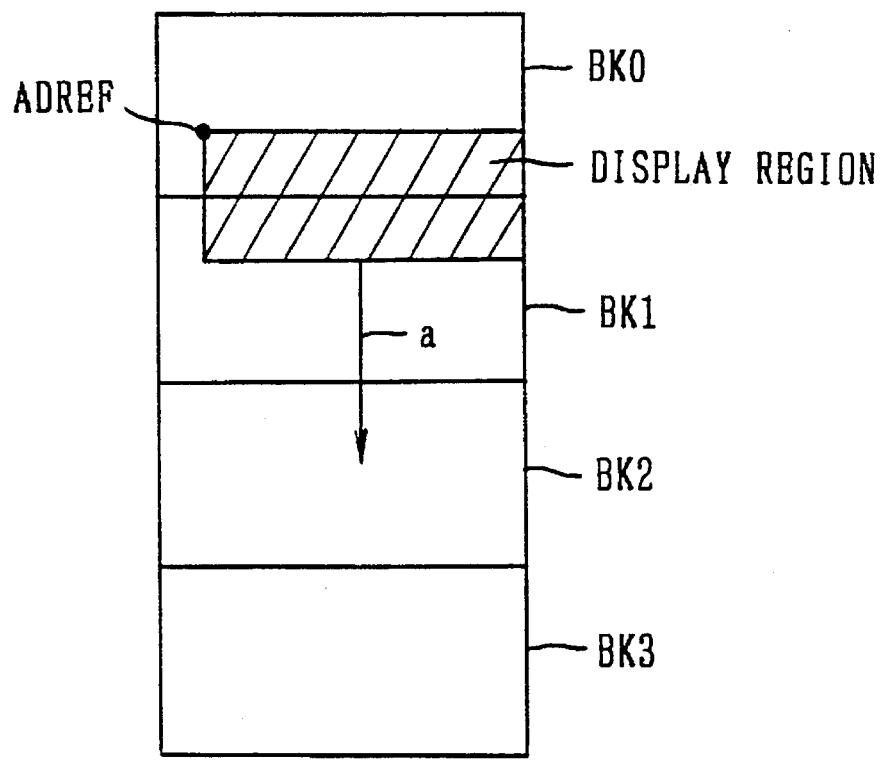
FIG. 11 is a schematic view showing a case where a picture for synthesizing is to be vertically scrolled.
Figure 12:
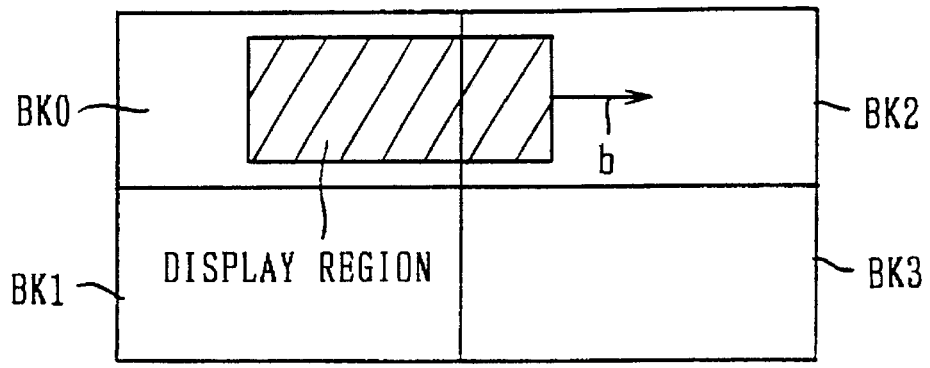
FIG. 12 is a schematic view showing a case where a picture for synthesizing is to be horizontally scrolled.
Figure 13:
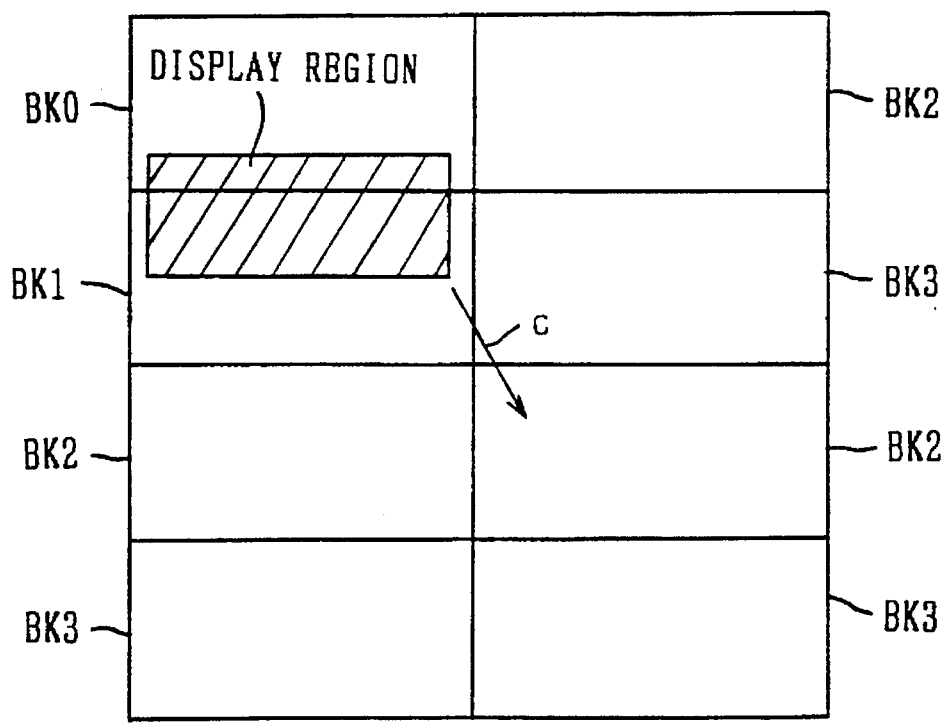
FIG. 13 is a schematic view showing a case where a picture for synthesizing is to be diagonally scrolled.

In this state, the reference address data ADREF is changed in the X direction, the Y direction, and the X and Y directions as indicated by the arrows a, b and c in FIGS. 11, 12 and 13. When address data generated in each of the address generating circuits 85 and 86 goes beyond location 1024 in this event, the picture memory 50 may be so used as to switch to banks BK2 and BK3 in the X direction, the Y direction, and the X and Y directions from the banks BK0 and BK1.

Suppose address data generated in the X direction address generating circuit 85 changes beyond location 1024 as shown in FIG. 14. As shown in FIGS. 15A to 15E, in the region of X direction address data not larger than location 1023, to the horizontal synchronizing signal HD (FIG. 15A), the output signals CH0BK1 of the OR circuit 95 (FIGS. 15B and 15D) are held at logical L level whereas output signals CH0BK0 (FIGS. 15C and 15E) directly outputted from the look up table 94 are held at H and L levels during the horizontal scanning period starting from the banks BK0 and BK1, respectively. This enables the video graphic system 1 to be enhanced in operability by rearranging the arrangement of the banks BK0 to BK3.

Furthermore, in this embodiment the contents of the look up tables 93 and 94 may be updated using the CPU board 16, and this enables the banks BK0 to BK3 to be used in a reverse arrangement by constructing the tables so that reversing in logic level is conducted to an input, for example.

Figure 16:
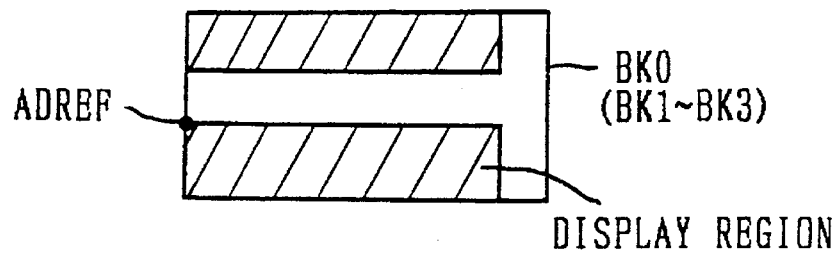
FIG. 16 is a schematic view showing a case where a picture for synthesizing is to be vertically scrolled in a bank.
Figure 17:
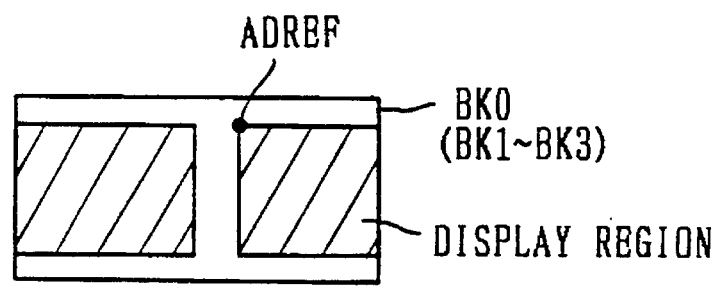
FIG. 17 is a schematic view showing a case where a picture for synthesizing is to be horizontally scrolled in a bank.
Figure 18:
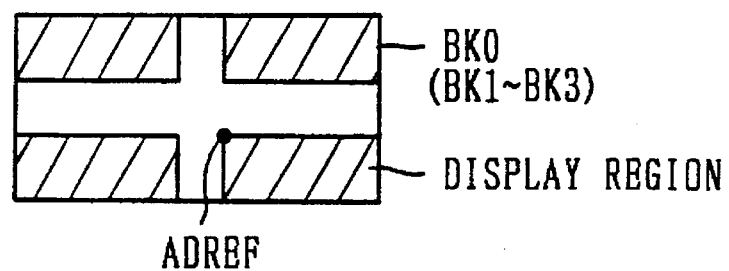
FIG. 18 is a schematic view showing a case where a picture for synthesizing is to be diagonally scrolled in a bank.

The contents of the tables may be set so as to send out output data held at predetermined values to input data, and thereby as shown in FIGS. 16 to 18 to correspond to FIGS. 11 to 13, picture data may be outputted so that a picture turns by selecting one of the banks BK0 to BK3.

With such a simple construction as to merely update the contents of the look up tables 93 and 94, the configuration of the picture memory may be varied for each of the main channel CH0 and subchannel CH1, and thereby the video graphic system 1 is enhanced in operability.

(3) Control of the look up tables

Figure 19:
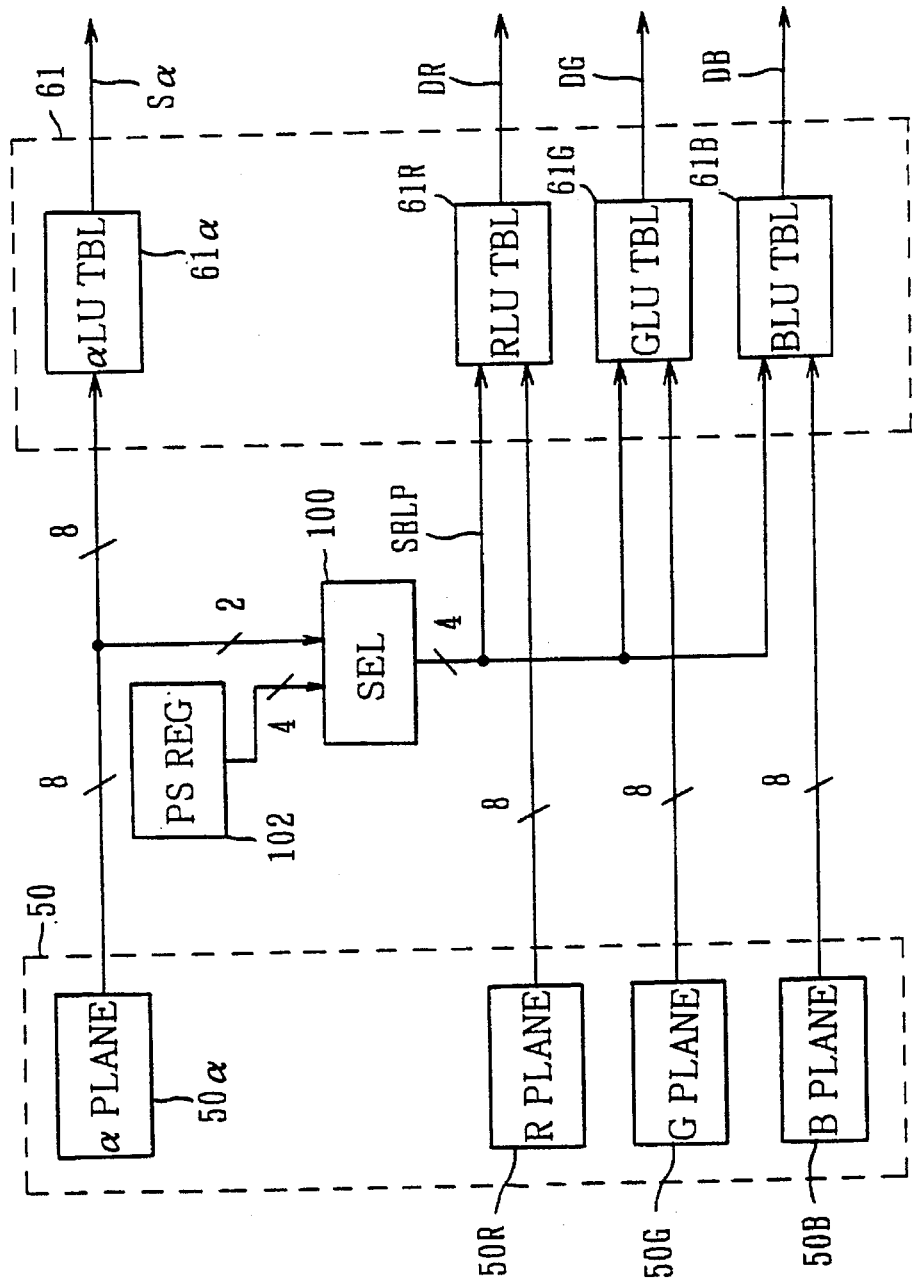
FIG. 19 is a block diagram for illustrating the control of the look up tables.

As shown in FIG. 19, the look up table 61 consists of four kinds of look up tables 61α, 61R, 61G and 61B for alpha, R, G and B. The look up tables 61 outputs 8 bit alpha signal Sα whereas R, G and B look up tables 61R, 61G, and 61B output 8 bit image data DR, Dg and DB, respectively.

To correspond to this, in the picture memory 50 each of the banks BK0 to BK3 consists of 8 bit alpha plane 50α, R plane 50R, G plane 50G and B plane 50B. In the case where video signals are processed in color signal mode, red, green and blue color signals are assigned to R plane 50R, G plane 50G and B plane 50B, respectively. On the other hand, in the case of processing video signals in color difference signal mode, I signals, luminance signals and Q signals are allotted to the R plane 50R, G plane 50G and B plane 50B, respectively. Alpha signals Sα are commonly assigned to the alpha plane 50α.

Each of the look up tables 61 is constructed of 16 pages of 256 words, and each page may be selected in response to a page selection signal SELP outputted through a selector 100.

More specifically, the selector 100 outputs a page selection signal SELP, outputted from a page selection register 102, to the look up table 61 when the operation mode of the video graphic system 1 is set to alpha 8 mode on the basis of a control signal outputted from the CPU board 16.

In the page selection register 102, the contents are updated on the basis of control data outputted from the CPU board 16.

In this manner, a predetermined page of each of the look up tables 61α, 61R, 61G and 61B is selected through the CPU board 16 in the alpha 8 mode, and picture data DG is converted using these selected pages.

Figure 20A:
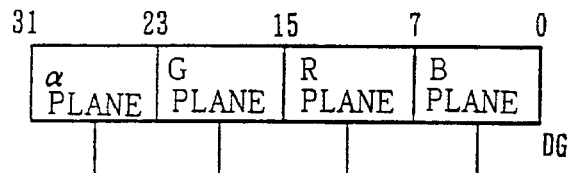
FIGS. 20A and 20B are schematic views for illustrating the alpha 8 mode.
Figure 20B:
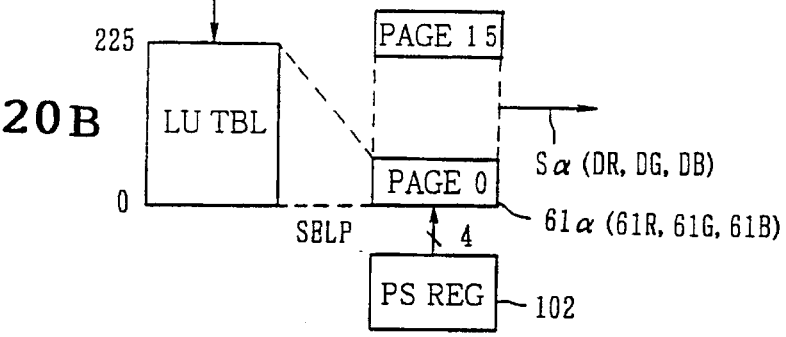

More specifically, the look up table 61, as shown in FIGS. 20A and 20B, receives picture data DG outputted from each plane (FIG. 20A), and the picture data DG is outputted through pages selected by the page selection signal SELP (FIG. 20B).

This enables the video graphic system 1 to execute gamma correction of picture data, picture enhancement of a highlighted scene, etc. in accordance with needs, and such processing may be switched between color signal mode and color difference signal mode.

In this event the video graphic system 1 outputs 8 bit image data DR, Dg and DB by independently accessing the look up table 61 in accordance with respective 8 bit address data, and thereby picture processing is performed without deteriorating picture quality of the natural picture.

When the alpha 6 mode is selected on the other hand, the selector 100 selectively accepts most significant 2 bits of picture data outputted from the alpha plane 50α, and replaces them with most significant 2 bits of a page selection signal outputted from the page selection register 102 and outputs them.

When the alpha 6 mode is selected, the video graphic system 1 therefore uses most significant 2 bits of the alpha signal as a page selection signal, and thereby painting or like processing may be executed with ease.

Figure 21A:
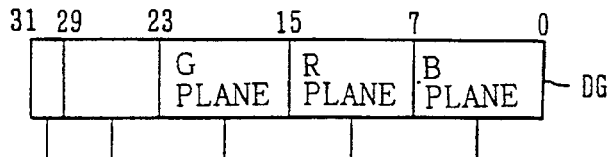
FIGS. 21A to 21C are schematic views for illustrating the alpha 6 mode.
Figure 21B:
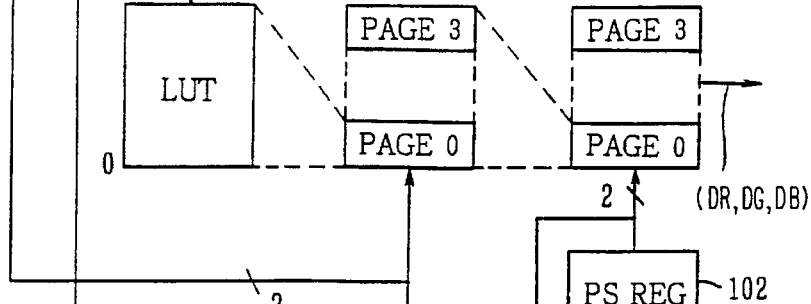

More specifically, when the alpha 6 mode is selected as illustrated in FIG. 21, in the look up table 61 page determined by the most significant 2 bits and the least significant 2 bits of the page selection register 102 are selected about the picture data of the R plane, G plane and B plane (FIG. 21A), and the picture data DR, Dg and DB is outputted using the page (FIG. 21B).

Figure 22A:
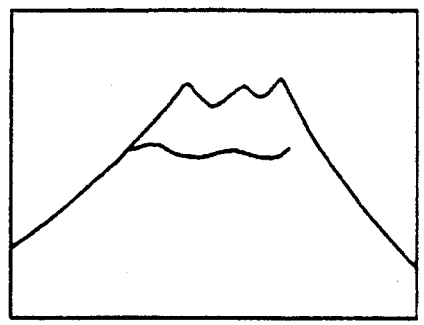
FIGS. 22A to 22C are schematic views for illustrating synthesizing of the natural picture.
Figure 22B:
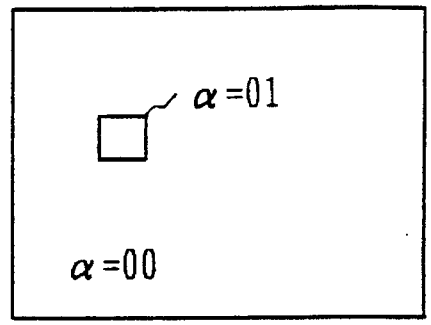

In this manner, in the graphic board 18 a natural picture produced by the picture data of the R plane, G plane and B plane is formed (FIG. 22A), and in this event the most significant 2 bits of the alpha signals Sα are switched to form a rectangle (FIG. 22B).

Figure 22C:
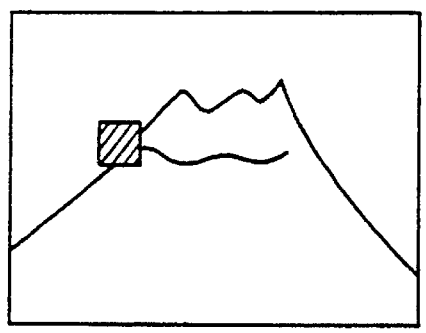

In the look up table 61, the table is set so that picture data having the same value with the page assigned to the rectangular area may be outputted, and the table is further formed so as to output the input data without any change to the value about the pages assigned to the remaining part. This enables a rectangular cursor to be shown in the natural picture (FIG. 22C).

In the video graphic system 1, a cursor may be displayed without providing any operation to the picture data of the R, G and B planes stored in the picture memory 50, and thereby a cursor may be displayed at a desired position with such a simple construction as to merely read out picture data from the picture memory 50 through the look up table 61.

In the video graphic system 1, part of the natural picture may be painted up in a desired color by freely setting regions in which the most significant 2 bits of the alpha data Sα are switched.

Alternatively, in the video graphic system 1 most significant 2 bits of the alpha data Sα of the region may be switched at a predetermined period, and different picture data may be stored in each page corresponding to the most significant 2 bits. This enables the painted up region to be changed to a predetermined color, and thereby such a display picture that appears to be blinking at the region may be produced.

Figure 23:
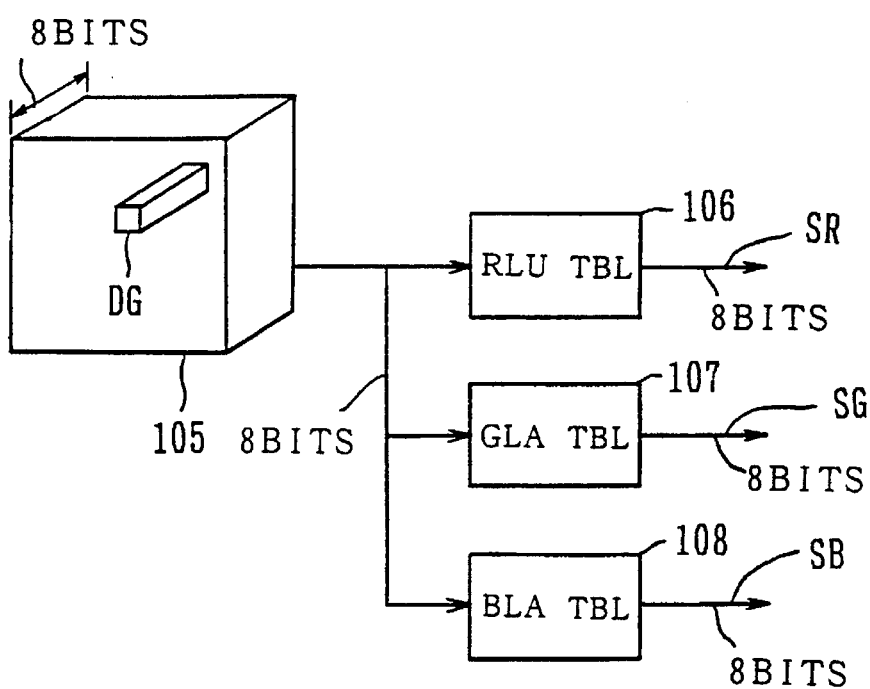
FIG. 23 is a block diagram for showing the general method for outputting picture data.

Practically, as shown in FIG. 23, in computers for personal use, 8 bits picture data DG outputted from the picture memory 105 is directly outputted to red, green and blue look up tables 106, 107 and 108, and thereby many colors are reproduced by enlarging the color space, using a small capacity picture memory.

In this method, the picture data DG stored in the picture memory 105 is not data of the picture to be displayed but is merely address data indicating addresses of the red, green and blue look up tables 106 to 108.

In accordance with this method, the picture data DG stored in the picture memory 105 is therefore directly rewritten so as to access predetermined regions of the red, green and blue look up tables 106 to 108, and thereby the rewritten regions may be set to predetermined colors.

This enables predetermined regions to be painted up, and colors used for painting up may be changed by sequentially updating address data of the regions. A function called palette animation can be achieved with ease.

However, this method is merely capable of reproducing a color space determined by the 8 bit address data, and is disadvantageous in that a fine color space such as a natural picture cannot be reproduced. Moreover, in the method of palette animation it is difficult to reproduce the original data by operating on the picture data DG itself stored in the picture memory 105.

In the case where red, green and blue look up tables 106 to 108 are accessed in accordance with respective independent 8 bit image data as in the alpha 8 mode in this embodiment, a fine color space such as a natural picture may be reproduced but there is a disadvantage in that the function of the palette animation cannot be achieved without rewriting all the picture data of 8 bits×3 channels.

That is, the palette animation cannot be carried out with ease, and also in the case of painting up in desired colors, it is difficult to reproduce the original data, by operating on the picture data itself.

On the other hand, in this embodiment the desired region may be easily painted up by operating only alpha signals Sα, and after the painting up, the original picture may be reproduced with ease.

By switching the mode, such a fine color space as a natural picture may be reproduced.

Figure 24:
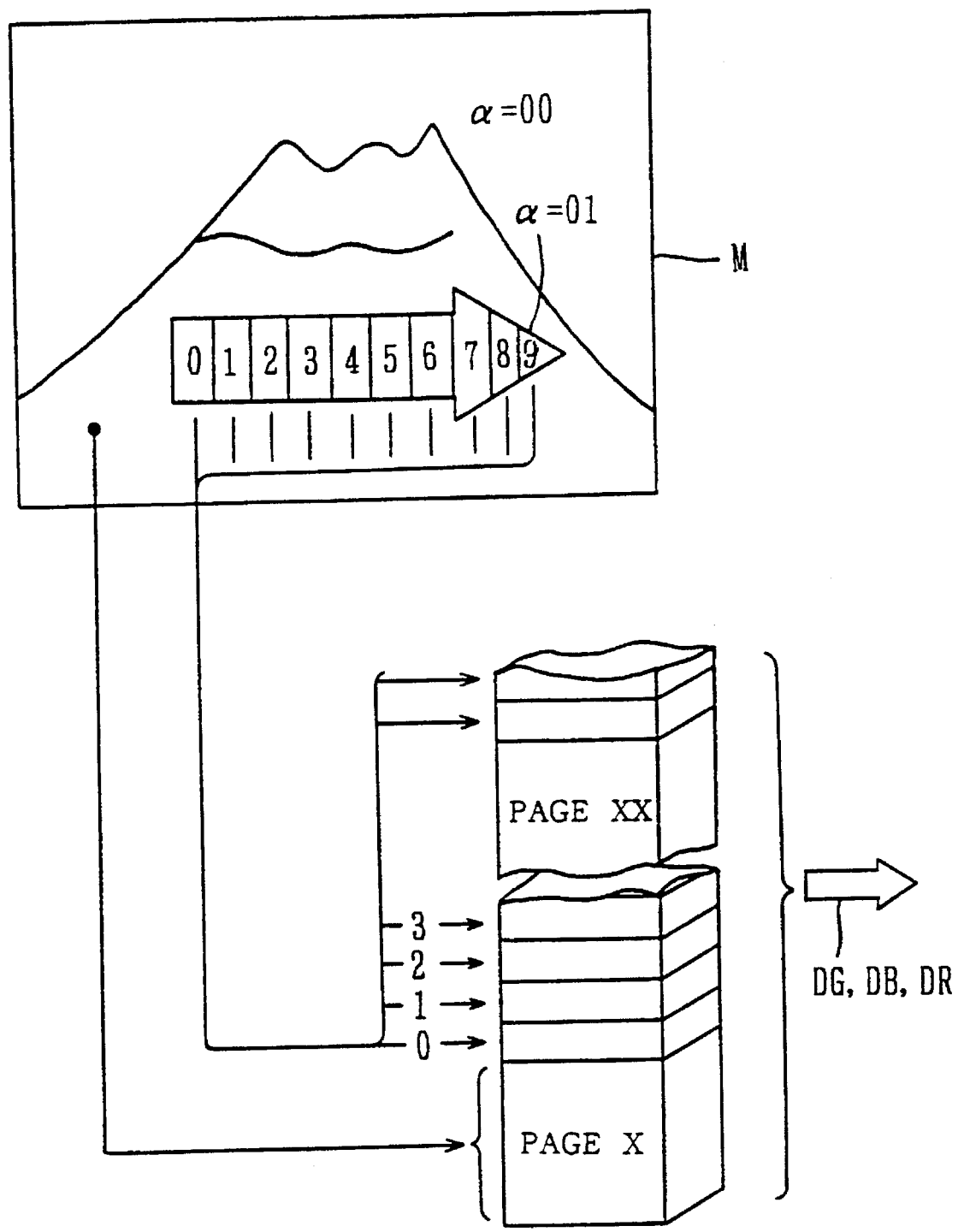
FIG. 24 is a block diagram for illustrating the palette animation.

Moreover as shown in FIG. 24, painted-up regions may be easily changed in color by rewriting the original picture data.

More specifically, in the video graphic system 1 the most significant 2 bits of the alpha data Sα concerning the original natural picture are set to "00" whereas the most significant 2 bits of the alpha data Sα are set to "01" in the region of the arrow in the original natural picture.

In the look up table 61, tables of pages which are determined by the value "00" are formed to output/input data without any change, and tables of other pages which are determined by value "01" are produced so as to sequentially change hue as addresses increase.

In the picture memory 50, in this state the picture data is rewritten to sequentially change the value at a predetermined pitch in the allowed region, and the picture data is updated so that the value sequentially increases by a predetermined value as time passes.

In the video graphic system 1, this enables the allowed region to be painted up so as to sequentially change in hue from the left to the right, and moreover it is possible to set the color to change as time passes.

A fine color space such as a natural picture may be reproduced by accessing to each of the look up tables assigned to red, blue and green color signals or luminance signals and color difference signals using independent 8 bit picture data.

In this event, each of the look up tables assigned to red, blue and green color signals, or luminance signals and color difference signals, is switched using data of most significant 2 bits of the alpha signals Sα; thereby, the display of a cursor may be easily achieved; predetermined regions may be painted up; and furthermore palette animation may be achieved with ease. The video graphic system 1 is therefore enhanced in operability with the simple construction.

When in the CPU board 16, the most significant 2 bits of the alpha signals Sα are used for page selection signals in the alpha 6 mode, the bit length which is available as alpha signals Sα becomes 6 bits as a result.

For this reason, in this embodiment the 6 bit alpha signals Sα are converted to 8 bit signals, which are outputted, in the alpha 6 mode, using the alpha look up table 61α.

Figure 21C:
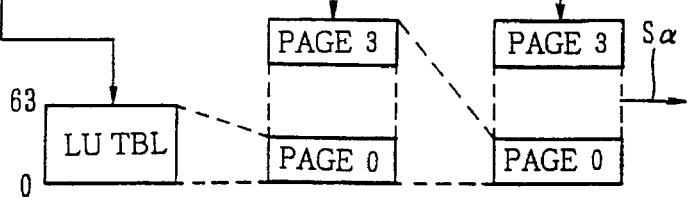

More specifically, in the alpha 6 mode pages of look up tables 61α which are determined in accordance with the most significant 2 bits of the alpha signals and the least significant 2 bits of the page selection register 102 are selected, and alpha signals Sα are outputted using the pages (FIG. 21C).

In this event, in the picture data of the alpha plane the look up tables 61α may be accessed by the least significant 6 bits since the most significant 2 bits of the alpha signals are used as the page selection signals, and thereby the alpha signals are produced in an address space of location 0 to 63.

Figures 25, 26:
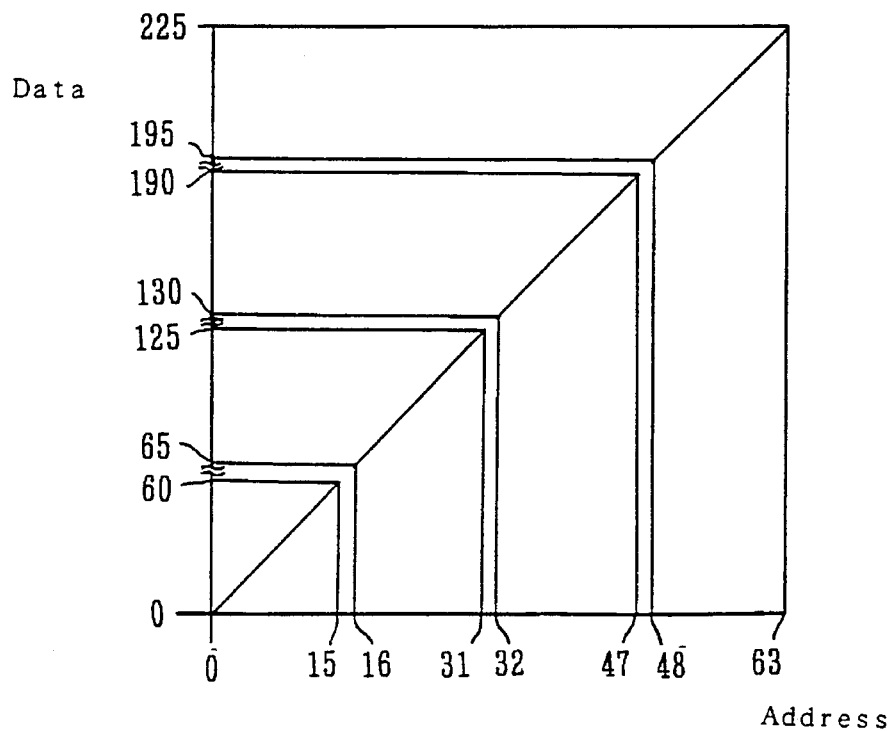
FIG. 25 is a schematic view for illustrating the look up table.
FIG. 26 is a characteristic graph for illustrating conversion of alpha signals.

In this event, in the pages of the look up tables 61 selected in the alpha 6 mode, data of values 0 to 255 is, as shown in FIGS. 25 and 26, outputted to address data of 0 to 63, and thereby even in the case of changing the mode, the same processing may be executed in the subsequent video signal processing unit 20.

(4) Encoder

In the video graphic system 1 of this embodiment, the processing mode of video signals may be selected, and a video signal may be therefore processed in the form of a color signals or a luminance signal and color difference signals in accordance with the user's selection.

Namely, in ordinary picture processing apparatuses, a video signal is processed in the form of a color signal.

In this kind of picture processing, good sharp pictures may be produced, however, by smoothing only a luminance signal in the case of smoothing, for example.

In this embodiment, the processing mode of a video signal may be therefore selected at the user's option, and this enhances the operability.

Figure 27:
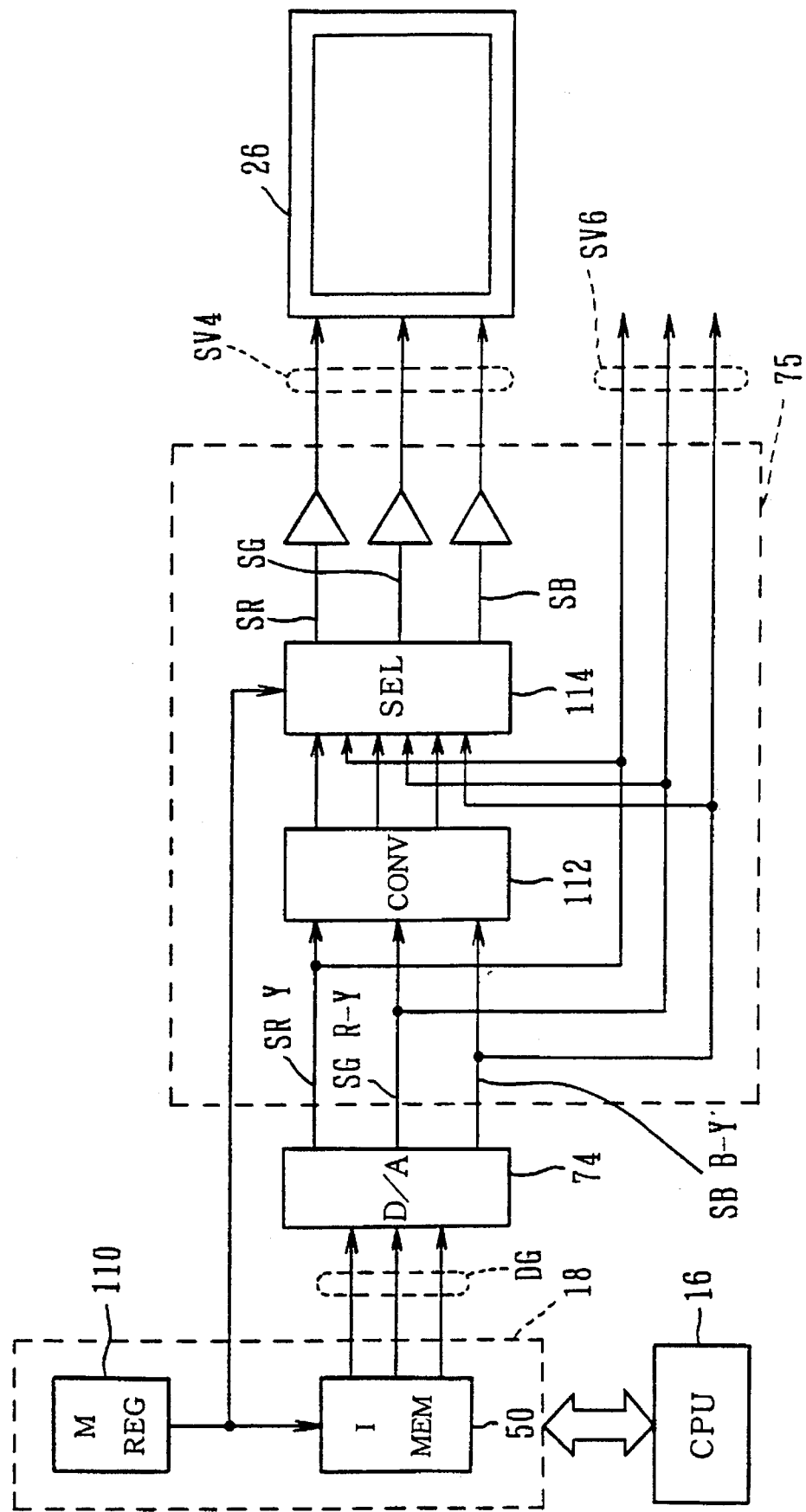
FIG. 27 is a block diagram for illustrating the encoder.

To do this, the CPU board 16 updates the contents of the mode register 110 by outputting a control signal in the graphic board 18 as shown in FIG. 27, and thereby the processing mode may be set to the graphic board 18.

The graphic board 18 selectively outputs picture data constructed of red, blue and green color signals or picture data of a luminance signal and color difference signals.

In the video signal processing unit 20, the picture data outputted from the picture memory 50 is received through the combiner 69 (FIG. 5) in the digital to analog conversion circuit 74, where it is converted to digital signals to output to the encoder 75.

Therefore, in accordance with the processing mode of the video graphic system 1 red, green and blue color signals SR, SG and SB or a luminance signal Y and color difference signals R-Y and B-Y are inputted to the encoder 75.

A conversion circuit 112 is built of a matrix circuit, which executes operations on a luminance signal Y and color difference signals R-Y and B-Y for converting the luminance signal Y and the color difference signals R-Y and B-Y into a color signal, and the operations are given by the following equations:

$$Y=0, 299R+0, 587G+0, 114B \quad (1)$$

$$R-Y=0, 500R-0, 419G-0, 081B \quad (2)$$

$$B-Y=0, 169R-0, 331G+0, 500B \quad (3)$$

These operations are reverse to the operation of producing a luminance signal and color difference signals.

The selector 114 switches contacts in response to switch signals outputted from the mode register 110. Therefore, in the case where the video graphic system 1 processes picture data in the color signal format, the digital to analog conversion circuit 74 directly outputs the color signals whereas in the case where the video graphic system 1 processes picture data in the form of a luminance signal and color difference signals the color signals outputted from the conversion circuit 112 are selected and outputted.

This always enables the video graphic system 1 to output a color signal to the video tape recorder 26 even in the case where the picture data processing mode is for a luminance signal and color difference signals, and thereby switching of the connection to the video tape recorder 26 or the like may be omitted.

In the video graphic system 1 the processing mode may be easily switched without switching the connection to external devices, and an improvement in operability is achieved.

Moreover in this embodiment the encoder 75 is capable of separately outputting output signals SV6 of the digital to analog conversion circuit 74, and thereby color signals, or a luminance signal and color difference signals, may be outputted in accordance with the processing mode of the video graphic system 1.

In the video graphic system 1, the display can be driven in the form of color signals, or a luminance signal and color difference signals by connecting the output signals SV6 to the display if necessary, and therefore the operability is enhanced.

(5) Cursor control

In the computer body 6 the information of procedure may be inputted through the screen of the display 8, and an picture of an object to be processed or the like is displayed through the display 21.

Figure 28:
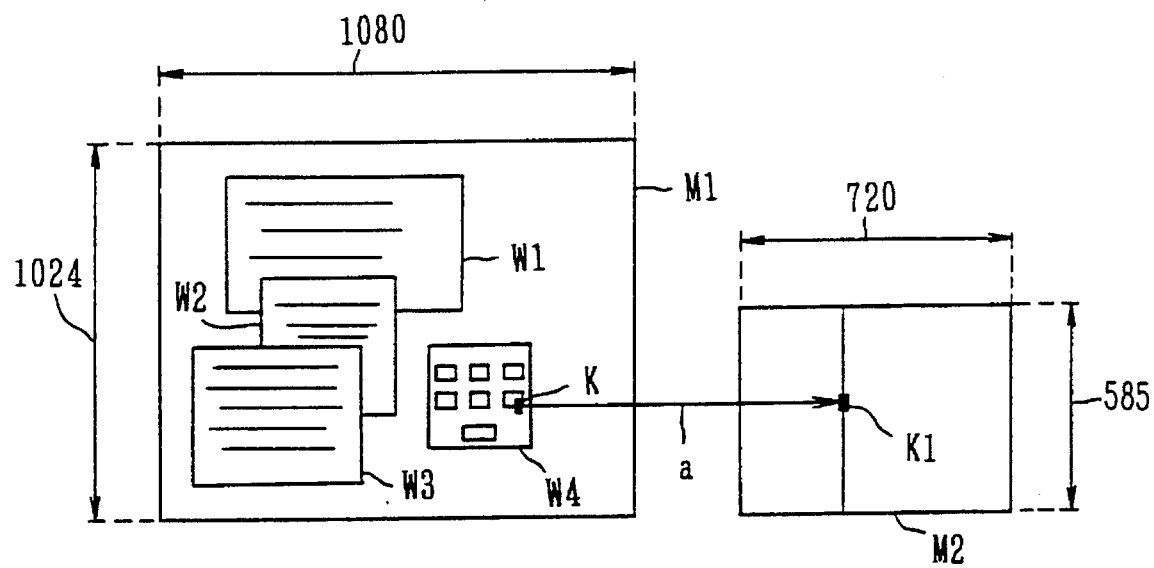
FIG. 28 is a schematic view for showing the screen.

More specifically, the computer body 6, as shown in FIG. 28, displays predetermined windows W1 to W4 on the screen of the display 8 in an overlapping manner, and when the user places the cursor K on a predetermined one of the windows W1 to W4 and clicks using the mouse 12, the window is displayed uppermost.

To achieve this, the computer body 6 enters coordinate data through the mouse 12, and vertically and horizontally divides the screen M1 into 1080×1024 display regions. The computer body 6 displays the cursor K at the corresponding display regions on the basis of the coordinate data received.

When in the computer body 6, the cursor K moves out of the screen M1 in the direction indicated by the arrow a by moving the mouse 12 horizontally, and the display of the cursor on the screen M1 is stopped.

When from this state the mouse 12 further moves to a predetermined region, the computer body 6 outputs the coordinate data of the mouse 12 and a control signal to the CPU board 16.

In response to this, the CPU board 16 switches the most significant 2 bits of the alpha signal about the display regions defined by the coordinate data, and thereby the cursor K1 is displayed on the screen M2 of the display 21 using the display method previously described.

This enables the video graphic system 1 to execute picture processing subsequently instructed about regions indicated by the cursor K1, for example, by setting the cursor K1 at a predetermined position.

To do this the CPU board 16 vertically and horizontally divides the screen M2 into 720×585 display regions as in the screen M1, and displays the cursor K1 at the corresponding display regions on the basis of the coordinate data received.

In the video graphic system 1, coordinate data inputted from the mouse 12 is set to a coordinate input region as shown in FIG. 28, and thereby the operation may be easily achieved by switching a single coordinate input means in the display screens M1 and M2.

In the case where the coordinate input means is used in a switching manner by moving the mouse 12 in such a manner, there are disadvantages in that the moving operation is rather complicated, and in that the operation is time consuming.

Moreover, there is a disadvantage in that it is not possible to visually confirm the position indicated by the mouse 12 until the cursor K1 is displayed on the screen M2 after the display of the cursor K on the screen M1 is stopped, and illegal operation may take place.

Figure 29:
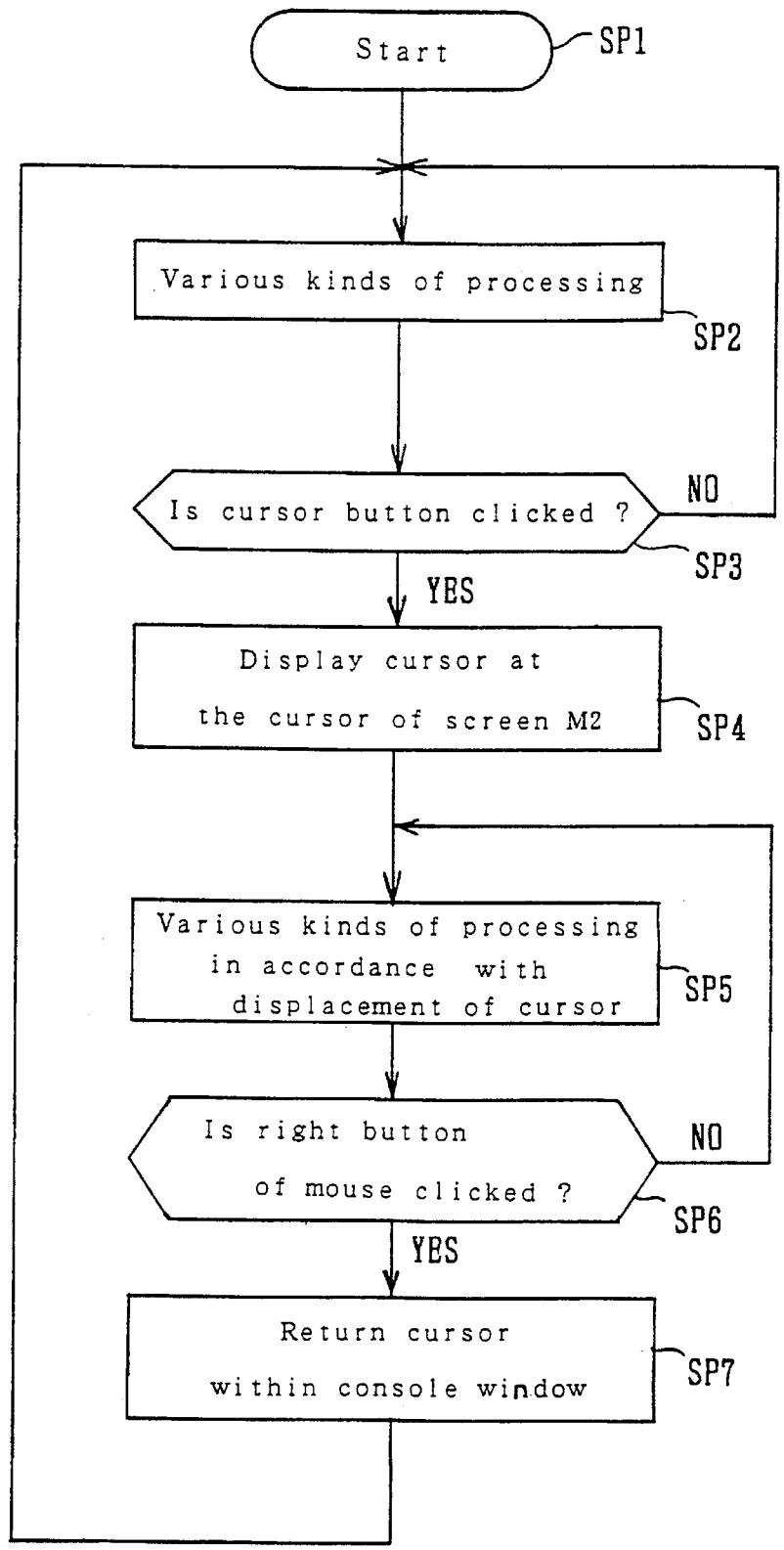
FIG. 29 is a flowchart for illustrating switching the display of the cursor.

To avoid this in this embodiment the display of the cursors K and K1 is switched by executing the procedure given in FIG. 29.

More specifically, when the computer body 6 is turned on and started from the initial status, it goes from the step SP1 to the step SP2, where various kinds of processing are executed in response to the operations of the mouse 12 and the key board 10, and then it proceeds to the step SP3.

Here, the computer body 6 judges whether or not the cursor jump button B1 in the screen M1 is clicked, and when a negative result is obtained, it returns to the step SP2.

Figure 30:
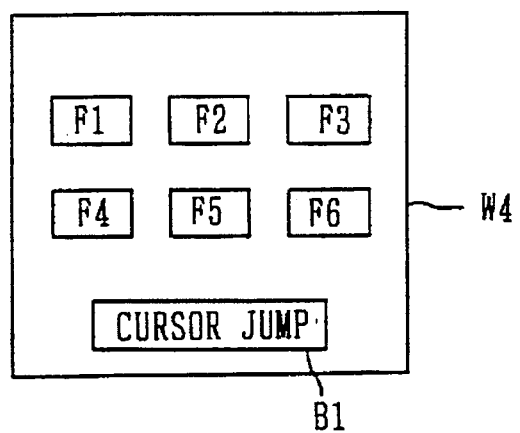
FIG. 30 is a schematic view for illustrating the cursor jump button.

More specifically, in this embodiment, the computer body 6, as shown in FIG. 30, displays a window W4 of functional buttons in the screen M1, and when the function button F1, for example, is operated, switching to line drawing mode is made.

The computer body 6 displays the cursor jump button B1 at a lower row in the window W4. The mouse 12 is clicked placing the cursor K on the cursor jump button B1, and then it is possible to judge whether or not the cursor jump button B1 is clicked.

When the cursor jump button B1 is clicked, an affirmative result is obtained in the step SP3, and the computer body 6 goes to the step SP4, where the display of the cursor K is stopped, and a predetermined control signal is outputted to the CPU board 16.

In response to this, the CPU board 16 displays the cursor K1 at the central portion of the screen M2.

This enables the video graphic system 1 to change the display of the cursor K to that of the cursor K1 by merely clicking the cursor jump button B1 without moving the mouse 12, and therefore the cursors are easily and positively switched with illegal operation previously prevented.

Subsequently, the computer body 6 proceeds to the step SP5, where the coordinate data is entered through the mouse 12, and the entered coordinate data is transferred to the CPU board 16.

This makes the CPU board 16 move the cursor K1 on the basis of the coordinate data with reference to the display position of the cursor K1 at the center of the screen, and thereby the video graphic system 1 is capable of executing various kinds of processing in response to the post of the cursor K1.

Subsequently, the computer body 6 goes to the step SP6, where it is judged whether or not the right side button 12B (FIG. 1) of the mouse 12 is clicked. When a negative result is obtained here, it returns to the step SP5 whereas it goes to the step SP7 when an affirmative result is obtained.

Here, the computer body 6 outputs a control signal to the CPU board 16, and displays the cursor K at a predetermined position within the window W4 simultaneously with stop of the display of the cursor K1.

This enables the video graphic system 1 to change the display from the cursor K1 to the cursor K by merely depressing the button 12B without moving the mouse to the original position.

Therefore, the display of the cursors K and K1 can be easily and positively changed, and the video graphic system 1 is enhanced in operability.

(6) Advantageous effects of the embodiment

According to the construction previously described, each of the look up tables assigned to red, blue and green color signals, or luminance signals and color difference signals, is independently accessed by 8 bit image data, and thereby a fine color space such as a natural picture can be reproduced.

In this event, pages of each of look up tables are switched using data of the most significant 2 bits of the alpha signal Sα. This enables that: the cursor is displayed with ease; a predetermined region may be painted up; and moreover palette animation is easily achieved. Therefore, the operability is enhanced with a simple construction.

(7) The other embodiments

In the embodiment previously described, there is stated a case where red, blue and green color signals, or luminance signals and color difference signals, are assigned to the picture memory in accordance with the mode. The present invention is however not limited to this but may be widely applied to a case where processing is carried out by assigning the red, blue and green color signals, or luminance signals and color difference signals.

Moreover in the foregoing embodiment it is stated that pages of each of the look up tables are changed using the data of the most significant 2 bits of the alpha signals Sα. The present invention is not restricted to this but may be widely applied to a case in which switching is made using the most significant bit, and to another case in which switching is conducted using alpha signals having a smaller number of bits.

In the embodiment mentioned above there is described the case where a look up table for the alpha signals is set so as to output 8 bit alpha signals in the alpha 6 mode. The present invention is not limited to this and in accordance with needs the present invention may be widely applied to a case where 6 bit signals are outputted, and further to another case where in conversion to 8 bits the conversion is made so that the gradation is continuous.

Moreover, in the embodiment mentioned above there is described the case where the present invention is applied to a video graphic system. The present invention is however not limited to this and may be widely applied to various picture data processing apparatus such as an animation apparatus.

While the invention has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A picture data processing apparatus comprising:

a frame memory for outputting color picture data and alpha data of a plurality of bits representing transparency of said color picture data;

picture data conversion means for converting said color picture data into predetermined conversion picture data, said picture data conversion means including a plurality of independently accessible look-up tables for a respective plurality of independent components of said color picture data, said tables each containing a plurality of pages of instructions for converting said color picture data into said predetermined conversion picture data and outputting said predetermined conversion picture data on the basis of a page corresponding to a page selection signal fed thereto; and page switching means for outputting said page selection signal fed to said picture data conversion means on the basis of said alpha data;

said apparatus being capable of operation in an alternative mode wherein a predetermined number of most significant bits of said alpha data are employed to form a cursor.

2. The picture data processing apparatus according to claim 1, wherein said color picture data are red, blue and green color picture data.

3. The picture data processing apparatus according to claim 1, wherein said color picture data are luminance and color difference picture data.

4. The picture data processing apparatus according to claim 1, wherein said page switching means outputs the page selection signal corresponding to a specific most significant bit of said alpha data.

5. The picture data processing apparatus according to claim 4, further comprising an alpha data change means for changing said alpha data except the specific most significant bit of said alpha data to an original bit size of said alpha data.

* * * * *